(12) United States Patent
Yamada et al.

(10) Patent No.: US 12,412,327 B2
(45) Date of Patent: Sep. 9, 2025

(54) INFORMATION PROCESSING APPARATUS, CONTROL METHOD THEREFOR, AND STORAGE MEDIUM

(71) Applicant: CANON KABUSHIKI KAISHA, Tokyo (JP)

(72) Inventors: Takayuki Yamada, Kanagawa (JP); Kouta Murasawa, Kanagawa (JP); Kazuya Ogasawara, Kanagawa (JP); Shinjiro Hori, Kanagawa (JP); Akitoshi Yamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 32 days.

(21) Appl. No.: 18/342,466

(22) Filed: Jun. 27, 2023

(65) Prior Publication Data

US 2023/0419575 A1    Dec. 28, 2023

(30) Foreign Application Priority Data

Jun. 28, 2022 (JP) ................. 2022-104050

(51) Int. Cl.
| | |
|---|---|
| G06T 11/60 | (2006.01) |
| G06F 3/04847 | (2022.01) |
| G06F 3/14 | (2006.01) |
| G06F 40/109 | (2020.01) |
| G06T 11/00 | (2006.01) |

(52) U.S. Cl.
CPC .......... G06T 11/60 (2013.01); G06F 3/04847 (2013.01); G06F 3/14 (2013.01); G06F 40/109 (2020.01); G06T 11/001 (2013.01)

(58) Field of Classification Search
CPC ...... G06T 11/60; G06T 11/001; G06F 40/109; G06F 3/04847; G06F 3/14; H04N 1/00196; H04N 1/0019
See application file for complete search history.

(56) References Cited

U.S. PATENT DOCUMENTS

| | | | |
|---|---|---|---|
| 2003/0137541 A1* | 7/2003 | Massengale ... | G06Q 10/063118 715/764 |
| 2004/0075669 A1 | 4/2004 | Bronstein | |
| 2006/0181736 A1* | 8/2006 | Quek ................. | G06T 11/60 358/1.18 |
| 2008/0222560 A1* | 9/2008 | Harrison ............ | G06F 3/04847 715/788 |
| 2011/0016385 A1 | 1/2011 | Kasuga | |
| 2015/0278163 A1 | 10/2015 | Kinkoh | |
| 2015/0348249 A1 | 12/2015 | Yamamoto | |
| 2016/0063746 A1 | 3/2016 | Furuya | |

(Continued)

FOREIGN PATENT DOCUMENTS

| | | |
|---|---|---|
| JP | 2010033551 A | 2/2010 |
| JP | 2016048408 A | 4/2016 |

(Continued)

*Primary Examiner* — Antonio A Caschera
(74) *Attorney, Agent, or Firm* — Canon U.S.A., Inc. IP Division

(57) ABSTRACT

An information processing apparatus includes at least one processor, and a memory that stores a program which, when executed by the at least one processor, causes the at least one processor to function as an acceptance unit configured to accept from a user a target impression of a poster image to be created, and a creation unit configured to create the poster image based on the target impression.

16 Claims, 21 Drawing Sheets

(56) References Cited

U.S. PATENT DOCUMENTS

| | | |
|---|---|---|
| 2016/0173944 A1 | 6/2016 | Kilar |
| 2017/0352083 A1 | 12/2017 | Ruck |
| 2018/0268586 A1 | 9/2018 | Furuya |
| 2019/0371027 A1 | 12/2019 | Noguchi |
| 2023/0070390 A1 | 3/2023 | Weng |
| 2023/0080407 A1 | 3/2023 | Kumar |

FOREIGN PATENT DOCUMENTS

| | | |
|---|---|---|
| JP | 6537419 B2 | 7/2019 |
| JP | 2020046994 A | 3/2020 |
| JP | 6958096 B2 | 11/2021 |
| WO | 2015129328 A1 | 9/2015 |

\* cited by examiner

FIG. 4

| COLOR SCHEME ID | COLOR #1 | COLOR #2 | COLOR #3 | COLOR #4 |
|---|---|---|---|---|
| 1 | (0, 0, 0) | (12, 66, 113) | (10, 129, 171) | (249, 223, 220) |
| 2 | (0, 48, 63) | (205, 172, 129) | (202, 228, 219) | (245, 244, 244) |
| 3 | (0, 168, 204) | (12, 123, 147) | (39, 73, 109) | (20, 40, 80) |
| 4 | (2, 2, 5) | (228, 58, 25) | (242, 244, 247) | (17, 31, 77) |

⋮

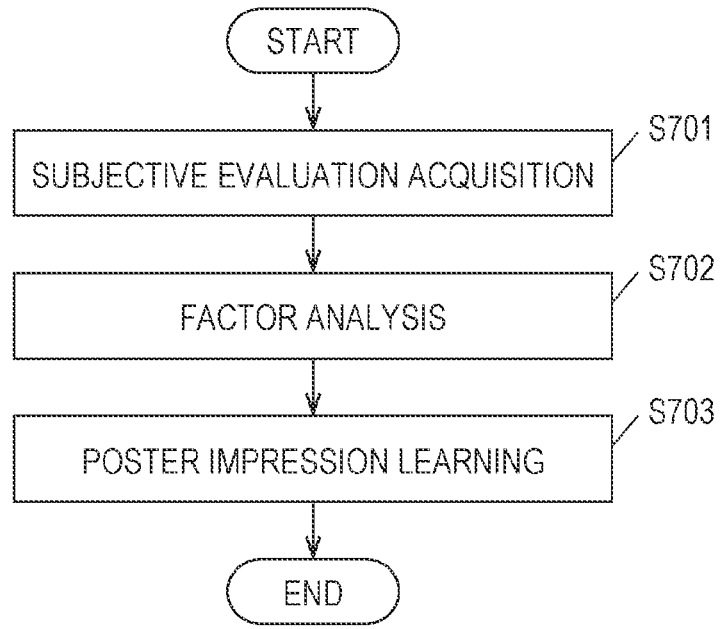

FIG. 9A

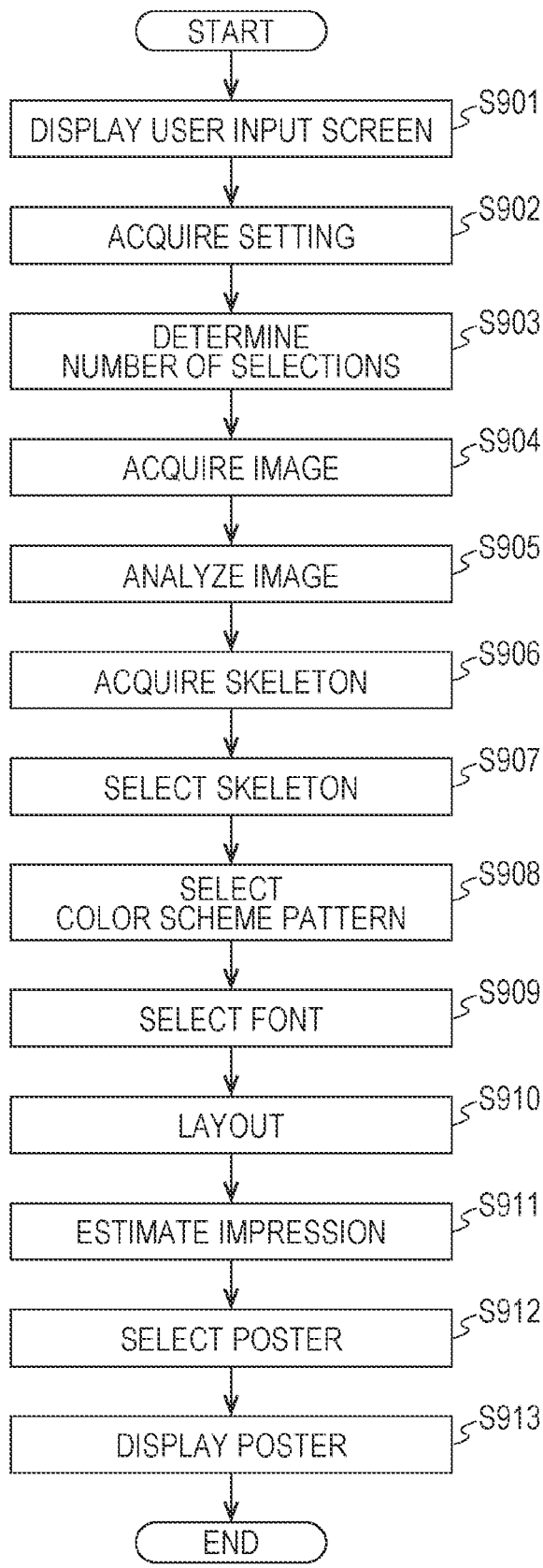

- START
- DISPLAY USER INPUT SCREEN — S901
- ACQUIRE SETTING — S902
- DETERMINE NUMBER OF SELECTIONS — S903
- ACQUIRE IMAGE — S904
- ANALYZE IMAGE — S905
- ACQUIRE SKELETON — S906
- SELECT SKELETON — S907
- SELECT COLOR SCHEME PATTERN — S908
- SELECT FONT — S909
- LAYOUT — S910
- ESTIMATE IMPRESSION — S911
- SELECT POSTER — S912
- DISPLAY POSTER — S913
- END

FIG. 9B

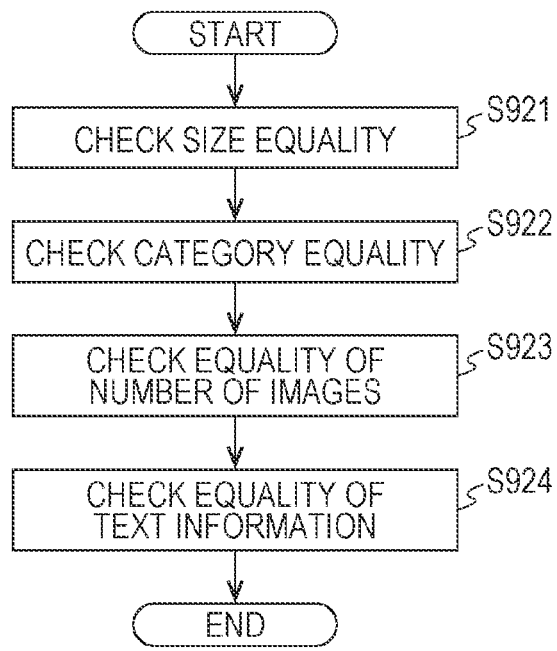

- START
- CHECK SIZE EQUALITY — S921
- CHECK CATEGORY EQUALITY — S922
- CHECK EQUALITY OF NUMBER OF IMAGES — S923
- CHECK EQUALITY OF TEXT INFORMATION — S924
- END

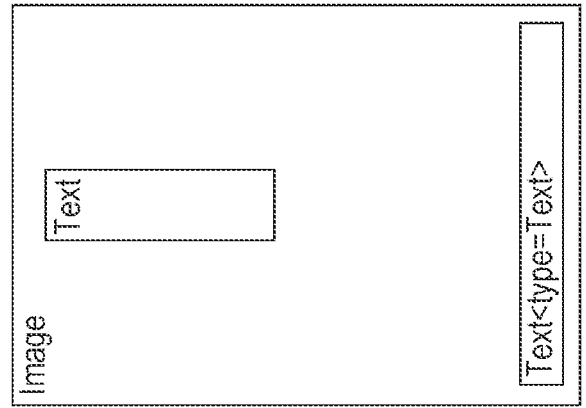
FIG. 10A
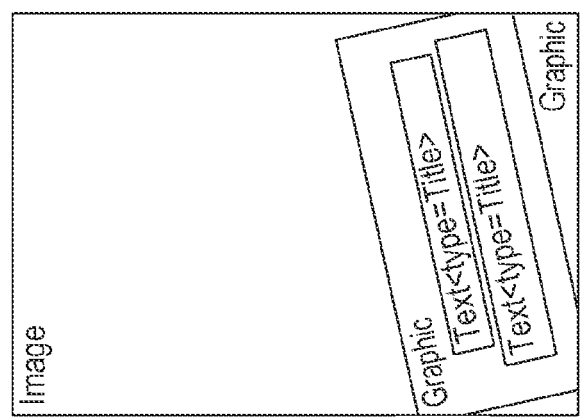
FIG. 10B
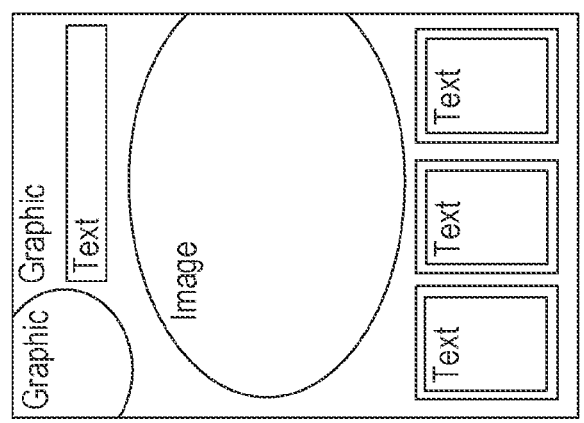
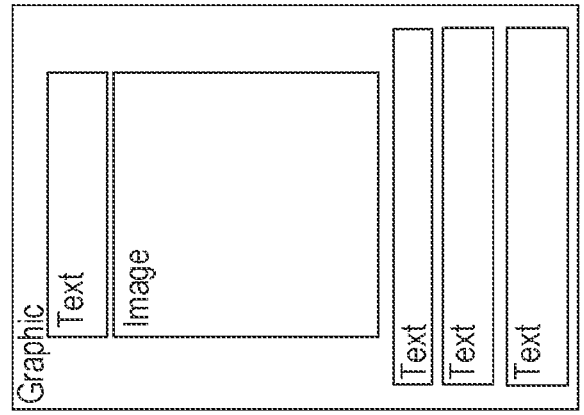
FIG. 10C

FIG. 11A

| COLOR SCHEME ID | COLOR #1 | COLOR #2 | COLOR #3 | COLOR #4 | LUXURY | FAMILIARLY | DYNAMISM | STATELINESS |
|---|---|---|---|---|---|---|---|---|
| 1 | (0, 68, 69) | (44, 120, 108) | (250, 245, 228) | (248, 180, 0) | −1 | +1 | −2 | +2 |
| 2 | (157, 37, 3) | (223, 133, 67) | (241, 241, 176) | (127, 169, 151) | −2 | 0 | +2 | +1 |
| 3 | (245, 176, 203) | (213, 151, 206) | (116, 92, 151) | (57, 55, 91) | +2 | 0 | −1 | −1 |
| 4 | (255, 255, 199) | (169, 241, 223) | (30, 174, 152) | (35, 62, 139) | +1 | +2 | −1 | −2 |

FIG. 11B

| FONT ID | TITLE FONT | TEXT FONT | LUXURY | FAMILIARLY | DYNAMISM | STATELINESS |
|---|---|---|---|---|---|---|
| 1 | FONT 5 | FONT 2 | −1 | +2 | +2 | −1 |
| 2 | FONT 8 | FONT 1 | +2 | +2 | +1 | −2 |
| 3 | FONT 12 | FONT 1 | +1 | +1 | −1 | +1 |
| 4 | FONT 6 | FONT 1 | +1 | −1 | 0 | 0 |

| SETTING ITEM | SETTING CONTENT |
|---|---|
| TITLE | GREAT SUMMER SALE |
| SUBTITLE | BLOW OFF THE MIDSUMMER HEAT |
| TEXT | (NOTHING IS SET) |
| IMAGE |  1401 |

| COLOR SCHEME ID | COLOR #1 | COLOR #2 | COLOR #3 | COLOR #4 |
|---|---|---|---|---|
| 1 | (0, 68, 69) | (44, 120, 108) | (250, 245, 228) | (248, 180, 0) |
| 4 | (255, 255, 199) | (169, 241, 223) | (30, 174, 152) | (35, 62, 139) |

| FONT ID | TITLE FONT | TEXT FONT |
|---|---|---|
| 2 | FONT #8 | FONT #1 |
| 3 | FONT #12 | FONT #1 |

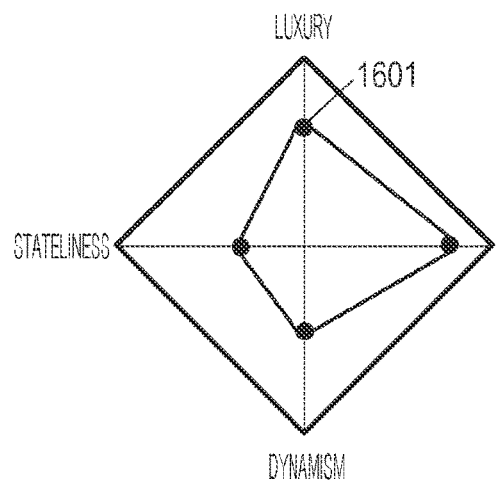
FIG. 16A
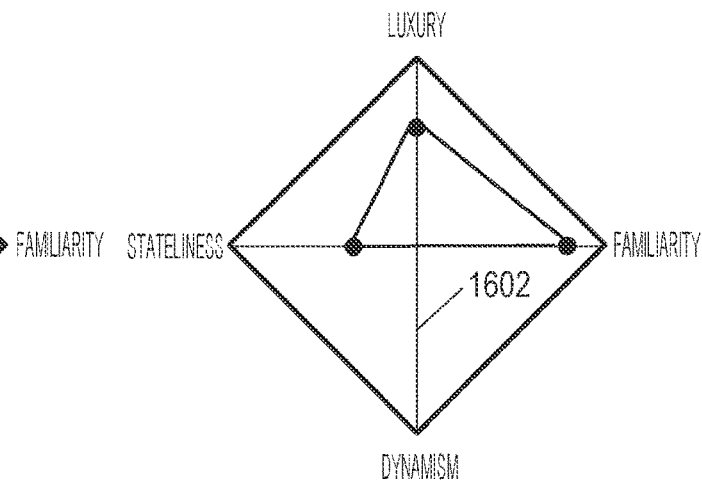
FIG. 16B
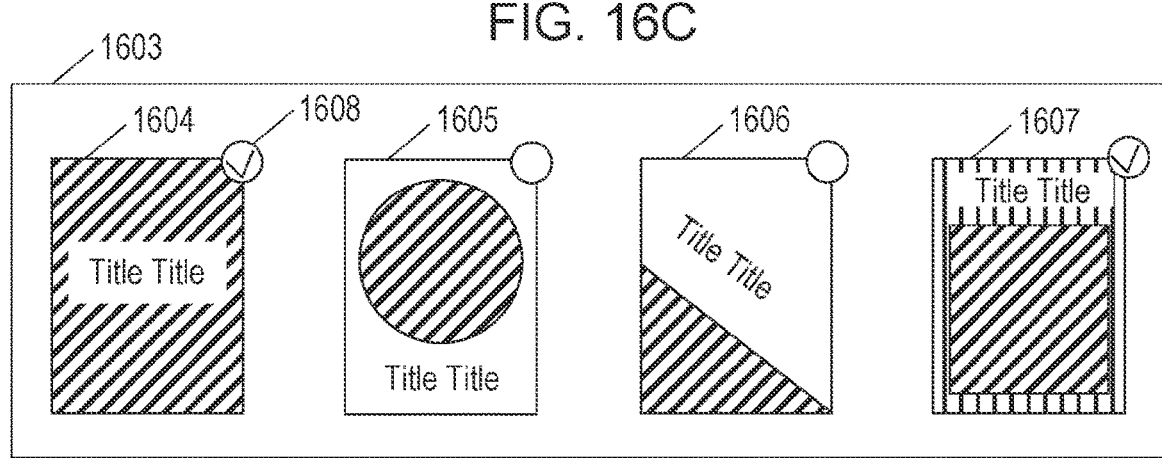
FIG. 16C
FIG. 16D
| POSTER | SELECTION STATE | LUXURY | FAMILIARITY | DYNAMISM | STATELINESS |
|---|---|---|---|---|---|
| 1604 | ✓ | +2 | −0.5 | −0.1 | +0.1 |
| 1605 | | 0 | +2 | +0.1 | −0.2 |
| 1606 | | +0.4 | −0.1 | +2 | +0.2 |
| 1607 | ✓ | −0.1 | 0 | +0.3 | +2 |
| TARGET IMPRESSION | | +2 | −0.5 | +0.3 | +2 |

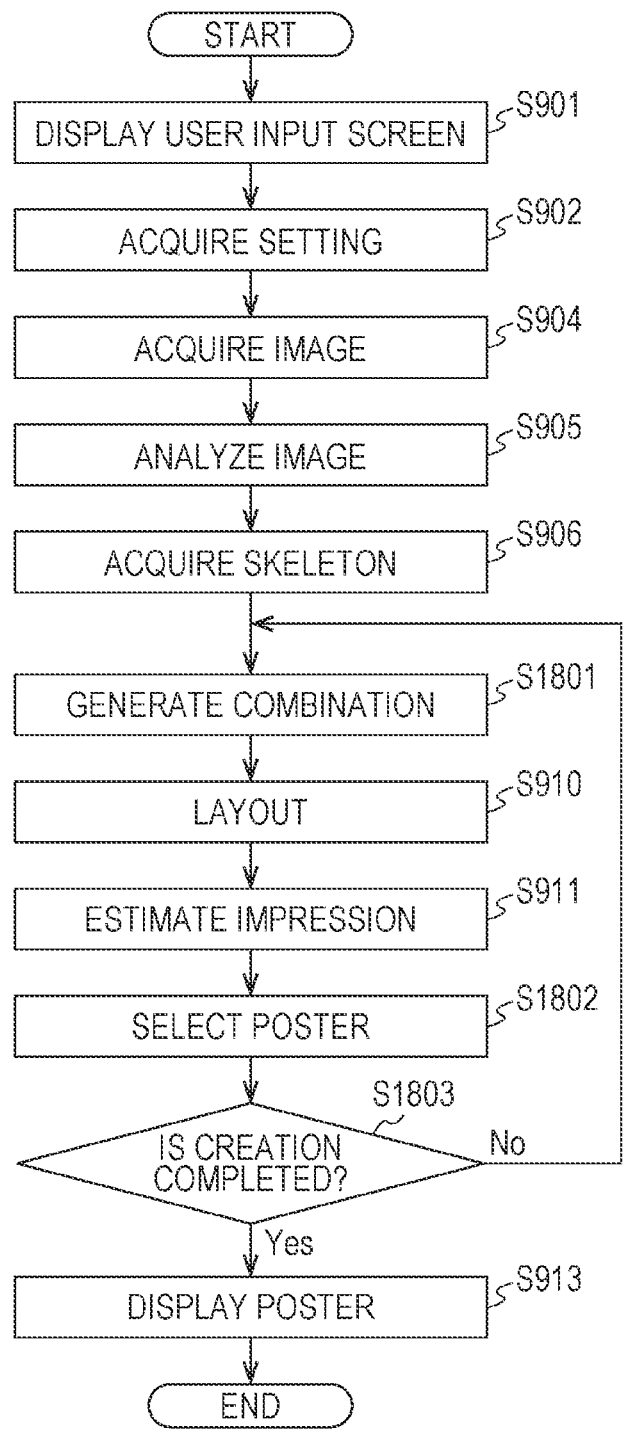

FIG. 19A

| SKELETON ID | FILE NAME |
|---|---|
| 1 | SKELETON #1 |
| 2 | SKELETON #2 |
| 3 | SKELETON #3 |
| 4 | SKELETON #4 |
| ... | |

FIG. 19B

| FONT ID | TITLE FONT | TEXT FONT |
|---|---|---|
| 1 | FONT #5 | FONT #2 |
| 2 | FONT #8 | FONT #1 |
| 3 | FONT #12 | FONT #1 |
| 4 | FONT #6 | FONT #1 |
| ... | | |

FIG. 19C

| COLOR SCHEME ID | COLOR #1 | COLOR #2 | COLOR #3 | COLOR #4 |
|---|---|---|---|---|
| 1 | (0, 68, 69) | (44, 120, 108) | (250, 245, 228) | (248, 180, 0) |
| 2 | (157, 37, 3) | (223, 133, 67) | (241, 241, 176) | (127, 169, 151) |
| 3 | (245, 176, 203) | (213, 151, 206) | (116, 92, 151) | (57, 55, 91) |
| 4 | (255, 255, 199) | (169, 241, 223) | (30, 174, 152) | (35, 62, 139) |
| ... | | | | |

FIG. 19D

| COMBINATION ID | SKELETON ID | COLOR SCHEME ID | FONT ID |
|---|---|---|---|
| 1 | 1 | 9 | 2 |
| 2 | 5 | 4 | 6 |
| 3 | 3 | 10 | 4 |
| 4 | 8 | 4 | 9 |
| ... | | | |
| 100 | 10 | 3 | 21 |

FIG. 20A

| COMBINATION ID | SKELETON ID | COLOR SCHEME ID | FONT ID | DISTANCE |
|---|---|---|---|---|
| 1 | 1 | 9 | 2 | 1.2 |
| 2 | 5 | 4 | 6 | 0.7 |
| 3 | 3 | 10 | 4 | 1.1 |
| 4 | 8 | 4 | 9 | 2.3 |
| ... | | | | |
| 100 | 10 | 3 | 21 | 1.5 |

FIG. 20B

| COMBINATION ID | SKELETON ID | COLOR SCHEME ID | FONT ID |
|---|---|---|---|
| 1 | 1 | 10 | 2 |
| 2 | 3 | 9 | 4 |
| 3 | 10 | 3 | 6 |
| 4 | 5 | 4 | 21 |
| ... | | | |
| 100 | 3 | 5 | 13 |

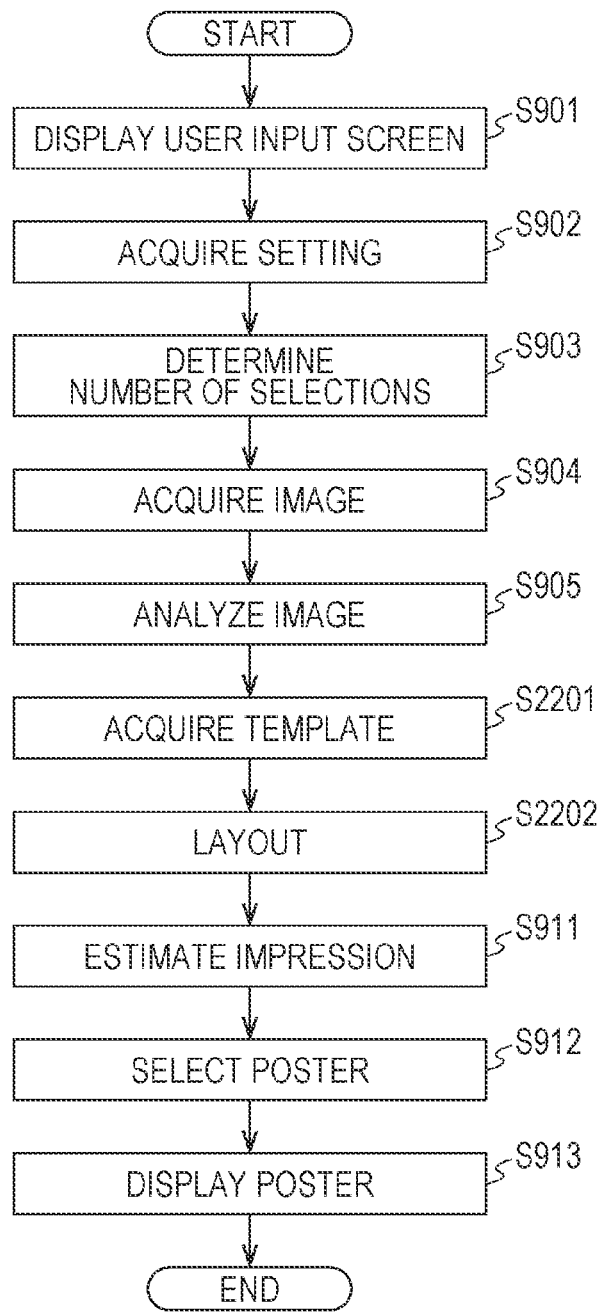

INFORMATION PROCESSING APPARATUS, CONTROL METHOD THEREFOR, AND STORAGE MEDIUM

BACKGROUND OF THE DISCLOSURE

Field of the Disclosure

The present disclosure relates to an information processing apparatus, a control method therefor, and a storage medium.

Description of the Related Art

Traditionally, a method has been proposed to create a poster by preparing a template including information about shapes and positions of images, texts, and graphics that make up the poster, and automatically arranging the images, texts, and graphics according to the template.

Japanese Patent No. 6537419 proposes generating a poster by selecting templates in ascending order of difference between the impression evaluation value of the template and the impression evaluation value of the image.

In a technique disclosed in Japanese Patent No. 6537419, a template having a small difference between an impression evaluation value of the template and an impression evaluation value of an image is selected, but no consideration is given to creating a poster so as to express an impression intended by a user.

SUMMARY OF THE DISCLOSURE

The present disclosure provides a technique for appropriately creating a poster expressing an impression intended by a user.

In view of the above, the present disclosure provides an information processing apparatus including at least one processor, and a memory that stores a program which, when executed by the at least one processor, causes the at least one processor to function as an acceptance unit configured to accept from a user a target impression of a poster image to be created, and a creation unit configured to create the poster image based on the target impression.

Further features of the present disclosure will become apparent from the following description of exemplary embodiments with reference to the attached drawings.

BRIEF DESCRIPTION OF THE DRAWINGS

FIG. 4 is a diagram illustrating color scheme patterns.

FIG. 7 is a flowchart illustrating a process of quantifying a poster impression in a poster creation process.

FIG. 8 is a diagram illustrating a subjective evaluation of a poster.

FIGS. 9A and 9B are flowcharts illustrating a poster creation process.

FIGS. 10A to 10C are diagrams illustrating a skeleton selection method.

FIG. 11A is a diagram illustrating color scheme patterns, and FIG. 11B is a diagram illustrating a font selection method.

FIGS. 16A to 16D are diagrams for illustrating examples of setting a target impression by a target impression specification unit.

FIG. 18 is a flowchart illustrating a poster creation process.

FIGS. 19A to 19D are diagrams for illustrating a process by a combination generation unit.

FIGS. 20A and 20B are diagrams for illustrating a process by a combination generation unit.

FIG. 22 is a flowchart illustrating a poster creation process.

DESCRIPTION OF THE EMBODIMENTS

Embodiments of the present disclosure are described in detail below with reference to the drawings. The following embodiments are not intended to limit the disclosure, which is defined in the claims, and not all of the combinations of features described in the embodiments are essential to the disclosure. The same reference numbers are used for the same constituent elements, and duplicated descriptions thereof are omitted. The same reference numbers are used for the same constituent elements, and duplicated descriptions thereof are omitted.

First Embodiment

A first embodiment discloses, by way of example, a method of automatically creating a poster by operating an application for creating a poster in a poster creation apparatus. In the following description, unless otherwise specified, an "image" refers to a still image or a frame image extracted from a moving image.

Figure 1:
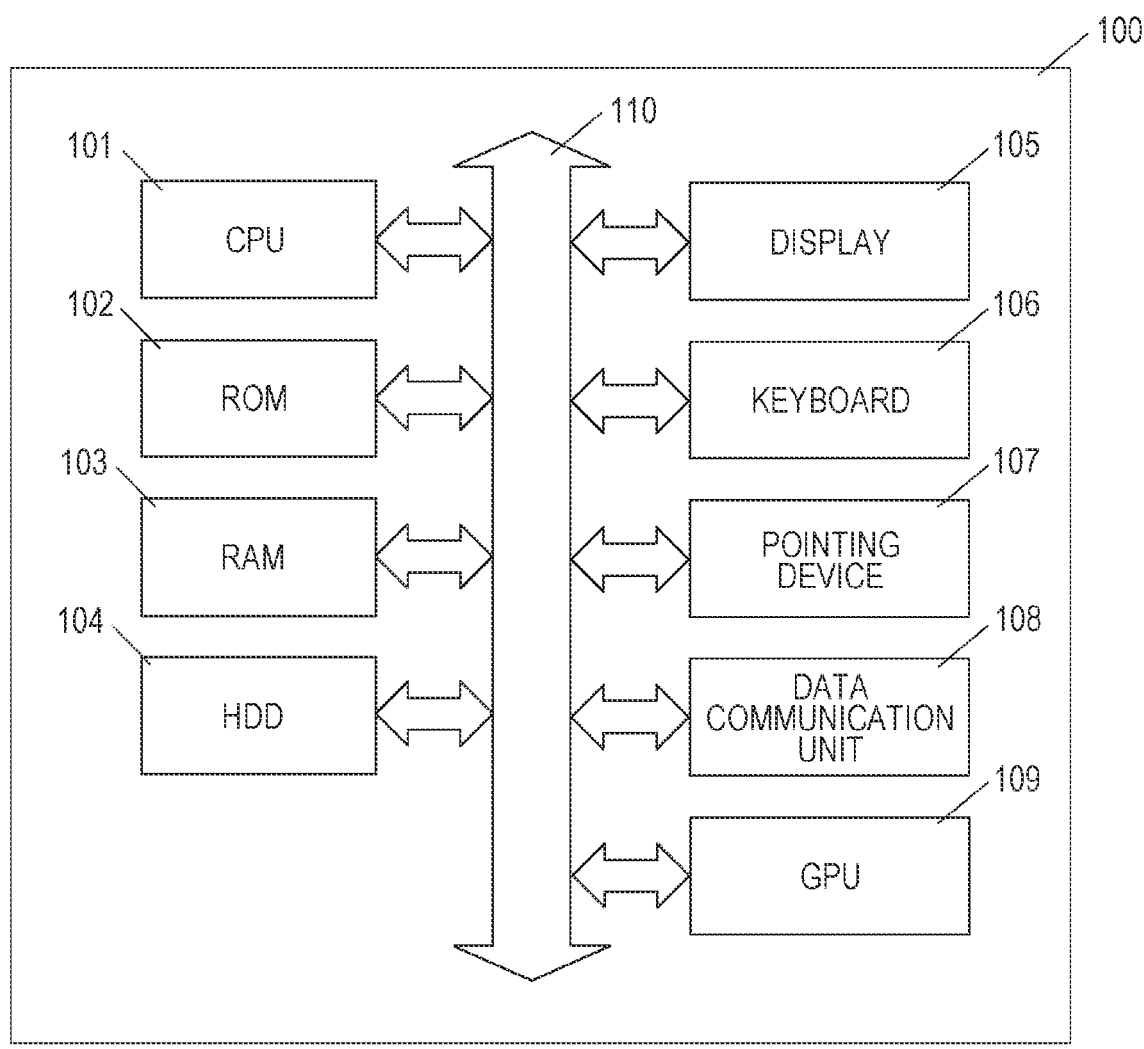
FIG. 1 is a block diagram illustrating a hardware configuration of a poster creation apparatus.

FIG. 1 is a block diagram illustrating a hardware configuration of a poster creation apparatus 100. The poster creation apparatus 100 may be realized by an information processing apparatus such as a personal computer (hereinafter referred to as "PC"), a smartphone, or the like. In the following description of the present embodiment, it is assumed that the poster creation apparatus is a PC. The poster creation apparatus 100 includes a CPU 101, a ROM 102, a RAM 103, an HDD 104, a display 105, a keyboard 106, a pointing device 107, and a data communication unit 108.

The CPU (central processing unit/processor) 101 comprehensively controls the poster creation apparatus 100 and realizes operations according to the present embodiment, for example, by reading a program stored in the ROM 102 into the RAM 103 and executing it. Although only one CPU is shown in FIG. 1, there may be a plurality of CPUs.

The ROM 102 is a general-purpose ROM and stores, for example, a program to be executed by the CPU 101. The RAM 103 is a general-purpose RAM and is used, for example, as a working memory to temporarily store various information when a program is executed by the CPU 101.

The HDD (Hard Disk Drive) 104 is a storage medium (a storage unit) for storing image files, a database of results of image analysis and other processing, and skeletons used by the poster creation application.

The display 105 is a display unit that displays a user interface (UI) according to the present embodiment and also displays image data (hereinafter, also referred to as an "image") as a layout result of an electronic poster to the user. The keyboard 106 and the pointing device 107 accept instructional operations from the user. The display 105 may have a touch sensor function.

The keyboard 106 is used, for example, by the user to enter the number of double-page poster sheets to be generated, on the UI shown on the display 105.

The pointing device 107 is used, for example, by the user to click a button on the UI displayed on the display 105.

The data communication unit 108 communicates with an external apparatus via a wired or wireless network. For example, the data communication unit 108 transmits data laid out by an automatic layout function to a printer or a server that can communicate with the poster creation apparatus 100.

The data bus 110 connects the blocks shown in FIG. 1 such that they can communicate with each other.

Note that the configuration shown in FIG. 1 is only an example and is not limited to this. For example, the poster creation apparatus 100 may not have the display 105 and may display the UI on an external display.

In the present embodiment, the poster creation application is stored in the HDD 104. The poster creation application is started when a user performs an operation such as clicking or double-clicking on an application icon displayed on the display 105 with the pointing device 107.

Figure 2:
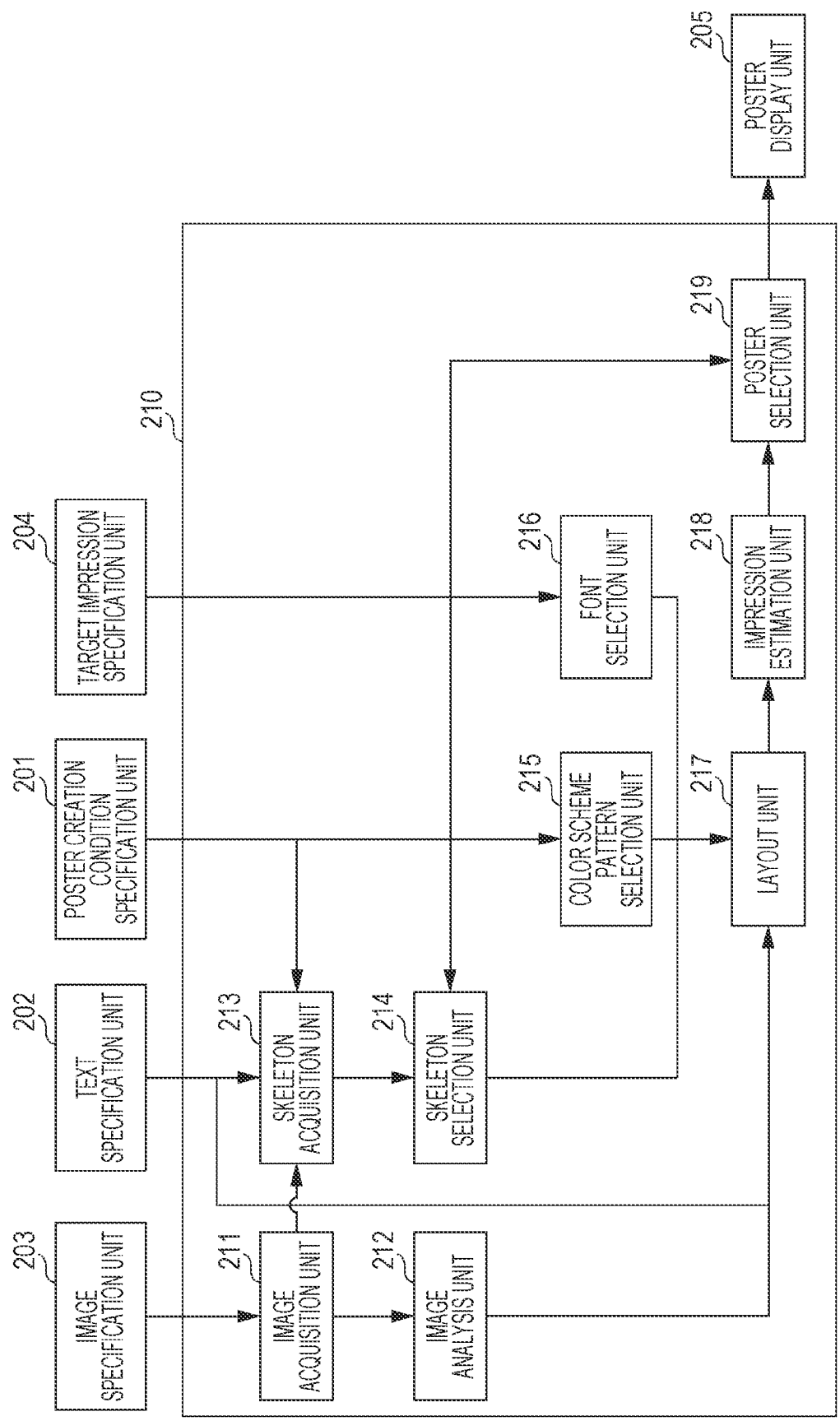
FIG. 2 is a software block diagram of a poster creation application.

FIG. 2 is a software block diagram of a poster creation application. The poster creation application includes a poster creation condition specification unit 201, a text specification unit 202, image specification unit 203, a target impression specification unit 204, poster display unit 205, and poster creation unit 210. The poster creation unit 210 further includes an image acquisition unit 211, an image analysis unit 212, a skeleton acquisition unit 213, a skeleton selection unit 214, a color scheme pattern selection unit 215, a font selection unit 216, a layout unit 217, an impression estimation unit 218, and a poster selection unit 219.

When the poster creation application is installed in the poster creation apparatus 100, a start icon is displayed on a top screen (desktop) of the OS (operating system) running on the poster creation apparatus 100. When the user performs an operation (for example, double-clicking) on the start icon displayed on the display 105 with the pointing device 107, the poster creation application program stored in the HDD 104 is loaded into the RAM 103 and executed by the CPU 101. As a result, the poster creation application is started.

Program modules corresponding to the respective components shown in FIG. 2 are included in the poster creation application described above. By executing these program modules, the CPU 101 realizes the functions of the components shown in FIG. 2. In the following description of the respective components shown in FIG. 2, it is assumed that the corresponding components execute various processes. FIG. 2 shows a software block diagram related, among various units, the poster creation unit 210 that provides the automatic poster creation function.

The poster creation condition specification unit 201 specifies poster creation conditions to the poster creation unit 210 according to UI operations with the pointing device 107. In the present embodiment, the poster size, the number of posters to be created, and the purpose category are specified as the poster creation conditions. The poster size may be specified by actual width and height values, or by a paper size such as A1, A2, or the like. The purpose category indicates what the poster is used for, such as a restaurant, a school event, sales, etc.

The text specification unit 202 specifies text information to be placed on the poster by a UI operation using the keyboard 106. The text information placed on the poster includes a character string representing, for example, the title, the date and time, the location, and the like. The text specification unit 202 outputs each piece of text information to the skeleton acquisition unit 213 and the layout unit 217 such that each piece of text information is associated with type information indicating a type of information such as title information, date and time information, location information, or the like.

The image specification unit 203 specifies one or more pieces of image data to be placed on the poster from images stored in the HDD 104. The specifying of the image data may be performed by specifying a device or a directory or other similar file system structure where one or more images are stored. Alternatively, accompanying information of images such as shooting date and time or attribute information may be specified. The image specification unit 203 outputs the file path of the specified image to the image acquisition unit 211.

The target impression specification unit 204 specifies the target impression of the poster to be created. The target impression is an impression that the created poster is finally required to hold. In the present embodiment, a strength of an impression is specified by performing a UI operation on a word expressing the impression using the pointing device 107. Information indicating the target impression specified by the target impression specification unit 204 is shared by the skeleton selection unit 214, the color scheme pattern selection unit 215, the font selection unit 216, and the poster selection unit 219. The details of the impression will be described later.

Next, the configuration of the poster creation unit 210 is described in detail.

The image acquisition unit 211 acquires the one or more pieces of image data specified by the image specification unit 203 from the HDD 104. The image acquisition unit 211 outputs the acquired image data to the image analysis unit 212, and outputs the number of acquired images to the skeleton acquisition unit 213. Examples of images stored in the HDD 104 are still images and frame images extracted from moving images. The still images and the frame images are obtained from an imaging device such as a digital camera, a smart device or the like. The imaging device may be included in the poster creation apparatus 100 or may be included in an external apparatus. Note that when the imaging device is an external apparatus, images are acquired via the data communication unit 108. Alternatively, the still image may be an illustration image created by image editing software or a CG image created by CG generation software. The still image and the extracted image may be obtained from a network site or a server via the data communication unit 108 and a network. An example of the image obtained from a network site or a server is a social networking service image (hereinafter referred to as "SNS image"). The program executed by the CPU 101 analyzes the data attached to each image to determine the storage source. For example, SNS images may be acquired from SNS via the application, and acquisition sources may be managed in the application. The images are not limited to those described above, and other types of images may be obtained.

The image analysis unit 212 analyzes the image data acquired from the image acquisition unit 211 by a method described later to acquire information indicating an image feature value described later. More specifically, the image analysis unit 212 executes an object recognition process, which will be described later, and acquires information indicating the image feature value of the image data. The image analysis unit 212 outputs the image data to the layout unit 217 such that the information indicating the acquired image feature value is associated with the image data.

The skeleton acquisition unit 213 acquires from the HDD 104 one or more skeletons that meet the conditions specified by the poster creation condition specification unit 201, the text specification unit 202, and the image acquisition unit 211. In the present embodiment, the skeleton is information representing the placement of character strings, images, graphics, etc., to be placed on the poster.

Figure 3:
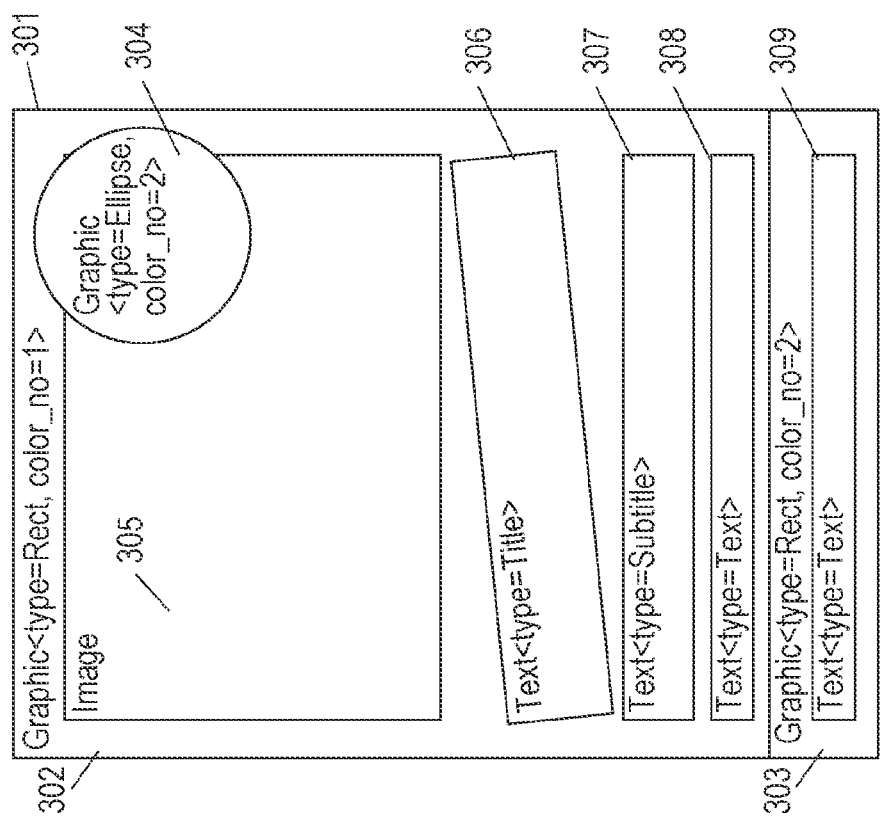
FIG. 3A is a diagram illustrating an example of a skeleton.
FIG. 3B is a diagram illustrating an example of metadata.

FIGS. 3A and 3B are diagrams for illustrating an example of a skeleton. Three graphic objects 302 to 304, one image object 305, and four text objects 306 to 309 on which text information is placed are placed on the skeleton 301 shown in FIG. 3A. In addition to the position, the size, and the angle of each object, metadata required to create a poster is also stored. FIG. 3B is a diagram illustrating an example of metadata. For example, text objects 306 to 309 hold metadata of attributes indicating types of text information placed on the respective text objects. In this example, the metadata indicates that a title is placed on the text object 306, a subtitle is placed on the text object 307, and main texts are placed on the text objects 308 and 309. The graphic objects 302 to 304 hold metadata of attributes indicating shapes of the graphics and color scheme numbers (color scheme IDs) indicating color scheme patterns. In this example, the metadata indicates that the graphic objects 302 and 303 are rectangles, and the graphic object 304 is an ellipse. It is assumed that the graphic object 302 is assigned the color scheme number 1, and the graphic objects 303 and 304 are assigned the color scheme number 2. The color scheme number is information to be referred to when a color scheme is assigned, which will be described later. Different colors are assigned to different color scheme numbers. Note that the types of objects and metadata are not limited to those described above. For example, there may be a map object for placement of a map, a barcode object for placement of a QR code (registered trademark) or a barcode. As for metadata of text objects, there may be metadata representing the space between lines and the space between characters. The purpose of the skeleton may be described in the metadata and may be used to control whether or not the skeleton is allowed to be used according to the purpose.

The skeleton may be stored in, for example, a CSV format in the HDD 104, or may be stored in a DB format such as SQL. The skeleton acquisition unit 213 outputs the one or more skeletons acquired from the HDD 104 to the skeleton selection unit 214.

The skeleton selection unit 214 selects one or more skeletons that match the target impression specified by the target impression specification unit 204 from the skeletons acquired from the skeleton acquisition unit 213, and outputs the selected skeletons to the layout unit 217. Since the layout of the entire poster is determined by the skeleton, it is possible to increase the variations of the created posters by preparing various types of skeletons in advance.

The color scheme pattern selection unit 215 acquires, from the HDD 104, one or more color scheme patterns that match the target impression specified by the target impression specification unit 204, and outputs the acquired color scheme patterns to the layout unit 217. Note that the color scheme pattern refers to a combination of colors used in a poster.

FIG. 4 is a diagram illustrating an example of a table of color scheme patterns. In the present embodiment, the color scheme pattern indicates a combination of four colors. In a color scheme ID column in FIG. 4, IDs each uniquely identifying a color scheme pattern are described. In color #1 to color #4 columns, colors are specified by RGB color values of 0 to 255 wherein the respective RGB color values are described in parentheses in the order of R, G, B ((R, G, B)=(0 to 255, 0 to 255, 0 to 255)). In the present embodiment, each color scheme pattern is given by a combination of four colors, but the number of colors included in each color scheme pattern is not limited to four. Furthermore, the number of colors may vary depending on specific color scheme patterns.

The font selection unit 216 selects and acquires, from the HDD 104, one or more font patterns that match the target impression specified by the target impression specification unit 204, and outputs the acquired font patterns to the layout unit 217. The font pattern refers to a combination of at least one of a title font, a subtitle font, and a text font.

The layout unit 217 generates one or more pieces of poster data by laying out various data on each skeleton of one or more skeletons acquired from the skeleton selection unit 214 such that the number of pieces of generated data is equal to or greater than the specified number of posters to be created. The layout unit 217 places, on each skeleton, the text acquired from the text specification unit 202 and the image data acquired from the image analysis unit 212, and applies the color scheme pattern and the font respectively acquired from the color scheme pattern selection unit 215 and the font selection unit. The layout unit 217 outputs the generated one or more pieces of poster data to the impression estimation unit 218.

The impression estimation unit 218 estimates the impression of each piece of poster data of the plurality of pieces of poster data acquired from the layout unit 217, and associates the estimated impression with each piece of poster data. The impression estimation unit 218 outputs one or more pieces of poster data associated with the estimated impression to the poster selection unit 219.

The poster selection unit 219 compares the estimated impression of each of the plurality of pieces of poster data associated with the estimated impression acquired from the impression estimation unit 218 with the target impression specified by the target impression specification unit 204, and selects the poster data with which the estimated impression closest to the target impression is associated. The selection result is stored in the HDD 104. The poster selection unit 219 outputs the selected poster data to the poster display unit 205.

The poster display unit 205 outputs a poster image to be displayed on the display 105 according to the poster data acquired from the poster selection unit 219. For example, the poster image is represented in bitmap data. The poster display unit 205 displays the poster image on the display 105.

Although not shown in the figure, the poster creation application may have a function of editing the created poster after the creation result is displayed on the poster display unit 205 such that the layout, the colors, and the shapes, etc. of the images, the texts, and the graphics are edited according to a user operation so as to achieve a design desired by the user.

When a function is provided that allows it to print poster data stored in the HDD 104 using a printer according to the conditions specified by the poster creation condition specification unit 201, the user can obtain the created poster in the printed form.

Examples of Display Screens

Figure 5:
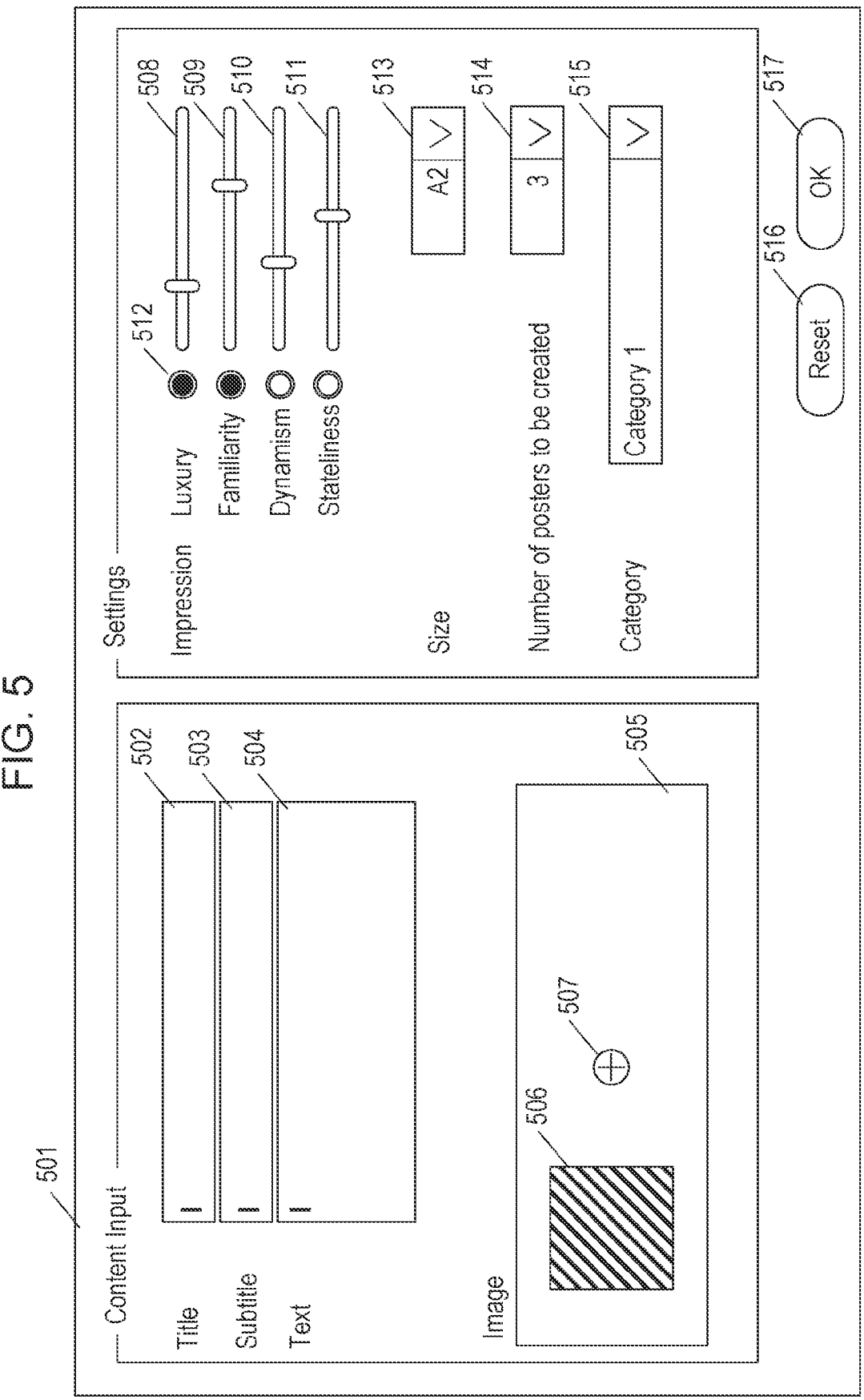
FIG. 5 is a diagram illustrating a display screen provided by a poster creation application.

FIG. 5 is a diagram illustrating an example of an application start screen 501 provided by the poster creation application. The application start screen 501 is displayed on the display 105. When the user sets poster creation conditions, texts, and images, which will be described later, via the application start screen 501, the contents of the setting made by the user are acquired via the UI screen by the poster creation condition specification unit 201, the image specification unit 203, and the text specification unit 202.

A title box 502, a subtitle box 503, and a main text box 504 accept specifying of text information to be placed on the poster. Three types of text information are accepted in the present embodiment, but this is by way of example and not limitation. For example, additional text information indicating a location, date and time, or the like may be accepted. It is not necessary that all are specified, and some specification boxes may be blank.

An image specification area 505 is an area in which images to be placed on the poster are displayed. An image 506 indicates a thumbnail of a specified image. An image addition button 507 is a button for adding an image to be placed on the poster. When the user presses the image addition button 507, the image specification unit 203 displays a dialog screen for selecting a file stored in the HDD 104 and accepts a selection of an image file from the user. A thumbnail of the selected image is added to the image specification area 505.

Impression sliders (impression slider bars, or impression setting sliders) 508 to 511 are objects for setting the factors of the target impression of the poster to be created. For example, the impression slider 508 is used to set the target impression in terms of factor of luxury. As the slider is moved to the right, the target impression in terms of the factor of luxury of the poster increases, and as the slider is moved to the left, the target impression of the poster in terms of the factor of luxury decreases (becomes cheap). By combining the factors of the target impression set by the respective sliders, not only the factors of the target impression set by one slider, but also the factors of the target impression set by the other sliders are reflected in the target impression. For example, in a case where the user performs a user operation on the screen of the poster creation application to set the impression slider 508 to the right of the center of the slider and the impression slider 511 to the left of the center of the slider, a poster with an impression of high luxury and low stateliness, that is, with an elegant impression is created. In a case where the user performs a user operation to set the impression slider 508 to the right of the center of the slider and the impression slider 511 to the right of the center of the slider, a poster with an impression of high luxury and high stateliness, that is, with a gorgeous impression is created. As described above, by combining the target impression factors indicated by a plurality of impression sliders, even if a target impression factor such as "luxury" is set in common, it is possible to combine with it various target impression factors such as "elegant" and/or "gorgeous". That is, the target impression determined by a plurality of factors indicating impressions, but may be determined by one factor indicating an impression. In the present embodiment, it is assumed that when the slider is set to the leftmost position, the impression has a value of −2, and when it is set to the rightmost position, the impression has a value of +2, and the value is corrected to an integer value in the range from −2 to +2. The values correspond to impressions such that −2 corresponds to "low", −1 to "rather low", 0 to "neutral", +1 to "rather high", and +2 to "high". It should be noted that the reason why the values are corrected to integer values in the range from −2 to +2 is to match the scale of the estimated impression described below thereby facilitating the distance calculation. The correction is not limited to the above manner. For example, the values may be normalized to values between 0 to 1.

Radio buttons 512 control enabling and disabling of the setting of respective corresponding target impressions. The user can set whether to enable or disable the setting of each target impression by pressing the corresponding radio button 512. For example, when the radio button 512 is set to be disabled, the control of the corresponding impression is not performed. For example, when a user wants to create a calm poster with low dynamism but does not care about any other impressions, he/she can turn off the radio buttons 512 except for the radio button for the dynamism to create a poster with an impression of low dynamism. In the example shown in FIG. 5, luxury and familiarity are set to be enabled, and dynamism and stateliness are set to be disabled. Thus, it is allowed to control all target impressions or a part of the target impressions to be used in the poster creation. That is, it is possible to flexibly control the target impressions in the poster creation. Note that when each slider is set to the leftmost position, the target impression is set to the same value as when the target impression is disabled (for example as in a case where when the slider 508 is set to the leftmost position, the impression of luxury is set to 0), the radio button 512 may be removed. In this case, the user can disable the setting of each target impression by setting the corresponding slider to the leftmost position.

A size list box 513 is a list box for setting the size of the poster to be created. In response to a clicking operation by the user with the pointing device 107, a list of available poster sizes is displayed and the user is allowed to select a desired size.

A box 514 is for setting the number of posters to be created.

A category list box 515 is used to set the purpose category of the poster to be created.

A reset button 516 is a button for resetting the setting information on the application start screen 501.

When the user presses an OK button 517, the poster creation condition specification unit 201, the text specification unit 202, the image specification unit 203, and the target impression specification unit 204 output the settings made on the application start screen 501 to the poster creation unit 210. As a result, the poster creation condition specification unit 201 acquires the size of the poster to be created specified in the size list box 513, the number of posters to be created specified in the box 514 for specifying the number of posters to be created, and the purpose category of the poster to be created specified in the category list box 515. The text specification unit 202 acquires text information to be placed on the poster from the title box 503, the subtitle box 503, and the main text box 504. The image specification unit 203 acquires the image file path from which the image to be placed on the poster, specified in the image specification area 505, is available. The target impression specification unit 204 acquires the target impressions of the poster to be created from impression sliders 508 to 511 and radio buttons 512. Note that the poster creation condition specification unit 201, the text specification unit 202, the image specification unit 203, and the target impression specification unit 204 may modify the values set on the application start screen 501. For example, the text specification unit 202 may remove unnecessary leading or trailing blank characters from the input text information. The target impression specification unit 204 may correct the values of target impressions specified by the impression sliders 508 to 511.

Figure 6:
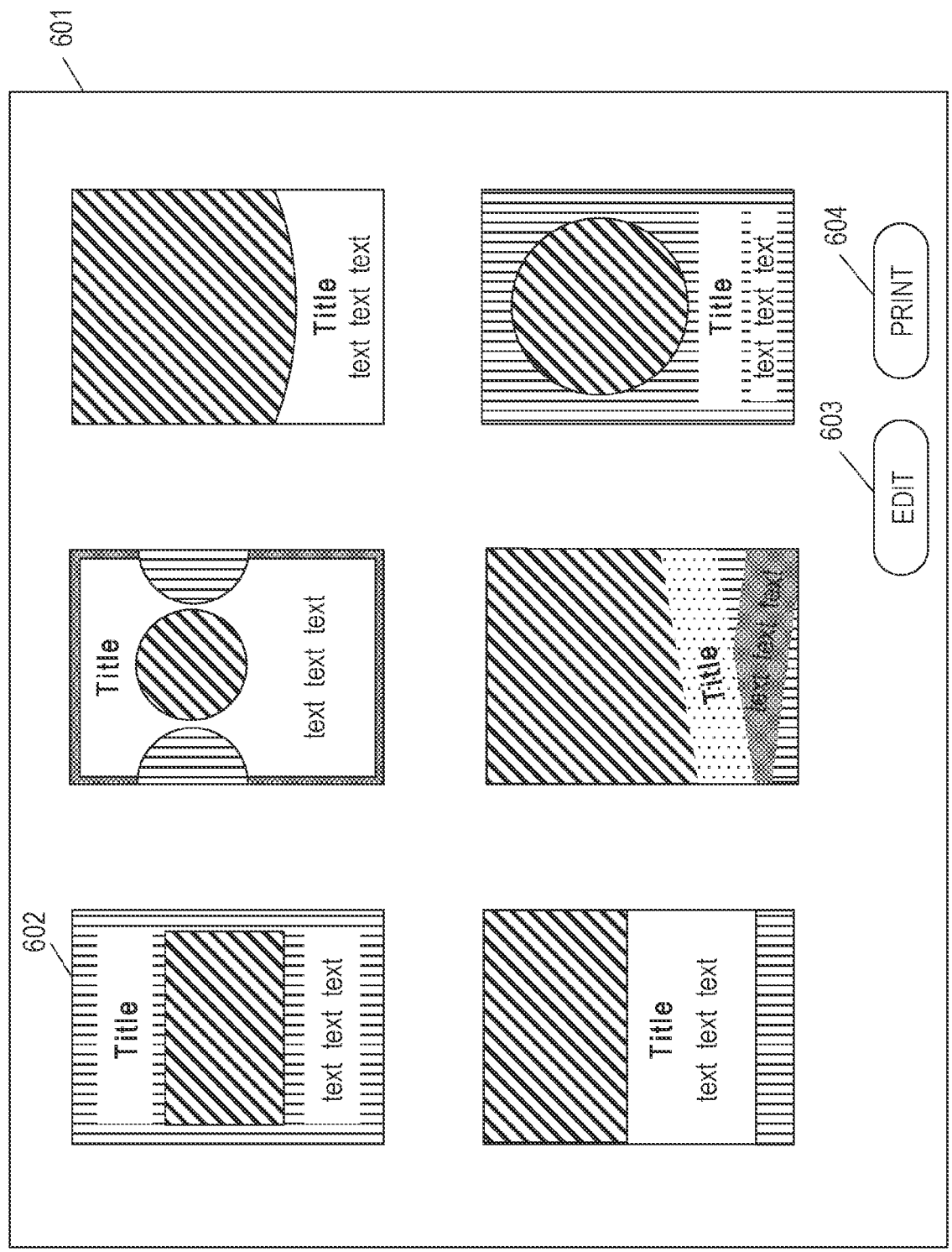
FIG. 6 is a diagram illustrating a display screen provided by a poster creation application.

FIG. 6 is a diagram illustrating an example of a poster preview screen displayed on the display 105 and a poster image created by the poster display unit 205 is displayed on the poster preview screen. When an OK button 309 on the application start screen 501 is pressed and the poster creating is completed, the screen displayed on the display 105 transitions to the poster preview screen 601.

A poster image 602 is a poster image output by the poster display unit 205. The poster creation unit 210 creates posters such that the number of created posters is equal to or larger than the number of posters to be created specified by the poster creation condition specification unit 201, and the created posters are displayed in a list as poster images 602 on the poster preview screen 601. When the user clicks a poster with the pointing device 107, the clicked poster is selected.

When an edit button 603 is pressed, it becomes possible to edit the selected poster via a UI that provides an edit function (not shown).

A print button 604 allows it to print the selected poster via a control UI of a printer (not shown).

Quantification of Poster Impression

A method for quantifying the impression of a poster is described below. This quantification process is necessary for the poster creation process and is performed as preprocessing of an impression estimation process in S911 in FIG. 9A, which will be described later. The process of quantifying the impression of the poster is performed at the stage of developing the poster creation application by a vendor or the like that develops the poster creation application. The process of quantifying the impression of the poster may be executed by the poster creation apparatus 100 or may be executed by an information processing apparatus different from the poster creation apparatus 100. Note that in a case where the process is performed by an information processing apparatus different from the poster creation apparatus 100, the process is executed by a CPU of this information processing apparatus.

The poster impression quantification process involves quantifying impressions that people have for various posters. At the same time, the correspondence between the poster image and the impression of the poster is derived. This makes it possible to estimate the impression of the poster from the generated poster image. If the impression can be estimated, it becomes possible to control the impression of the poster image by correcting the poster image, or to search for a poster image having a certain target impression. Note that the poster impression quantification process is executed, for example, by operating an impression learning application for learning the poster image impression in advance prior to the poster creation process in the poster creation apparatus.

FIG. 7 is a flowchart illustrating a poster impression quantification process. The flowchart shown in FIG. 7 is realized, for example, by the CPU 101 loading a program stored in the HDD 104 into the RAM 103 and executing the program. The poster impression quantification process is performed according to the flowchart shown in FIG. 7, which is described below. Note that the symbol "S" in the description of each process indicates a step in the flowchart (the same applies hereinafter in this specification).

In S701, the CPU 101 acquires a subjective evaluation of the impression of a poster.

FIG. 8 is a diagram for explaining an example of a method of a subjective evaluation of an impression of a poster. The CPU 101 presents the poster to a human evaluator and obtains from the human evaluator a subjective evaluation of the impression of the poster. In the evaluation, a measurement method such as an SD (Semantic Differential) method or a Likert scale method can be used. FIG. 8 illustrates an example of a questionnaire using the SD method, in which adjective pairs expressing impressions are presented to a plurality of human evaluators, and adjective pairs evoked by the target poster are scored. After the subjective evaluation results for a plurality of posters are acquired from a plurality of human evaluators, the CPU 101 calculates the average value of the responses to each adjective pair, thereby obtaining a representative score value for the corresponding adjective pair. The subjective impression evaluation may be performed by a method other than the SD method, as long as words expressing impressions and the score values corresponding to them can be determined.

In S702, the CPU 101 performs factor analysis on the subjective evaluation result acquired by the subjective evaluation acquisition unit. When subjective evaluation results are directly used, the number of dimensions is given by the number of adjective pairs, which results in complicated control. Therefore, it is desirable to reduce the number of dimensions to a small value using an analysis technique such as principal component analysis, factor analysis, or the like such that efficient analysis becomes possible. In the following description of the present embodiment, it is assumed that the dimensions are reduced such that the number of factors is reduced to four by factor analysis. Note that the number of factors varies depending on the selection of adjective pairs in the subjective evaluation and the method of factor analysis. It is also assumed that the output of factor analysis is normalized. That is, each factor is scaled to have a mean of 0 and a variance of 1 in the posters used for analysis. As a result, −2, −1, 0, +1, and +2 of the impressions specified by the target impression specification unit 204 can be directly corresponded to −26, −16, mean value, +16, and +26 in each impression, which makes it easy to calculate the distance between the target impression and the estimated impression, as will be described in further detail later. In the present embodiment, the four factors are luxury, familiarity, dynamism, and stateliness shown in FIG. 5. The names of these factors are given for convenience to convey impressions to the user via the user interface, and each factor is composed of a plurality of adjective pairs that influence each other.

In S703, the CPU 101 associated each poster image with the impression thereof. Although quantification can be performed for posters subjected to subjective evaluation by the above-described method, it is necessary to estimate the impression of posters that will be created without subjective evaluation. The correspondence between the poster image and the impression can be achieved by learning a model for estimating the impression from the poster image using, for example, a deep learning method using the convolution neural network (CNN) or a machine learning method using a decision tree, or the like. In the present embodiment, the impression learning unit performs supervised deep learning using the CNN with the poster image as input and the four factors as output. That is, subjectively evaluated poster images and corresponding impressions are learned as correct answers to create a deep learning model, and impressions are estimated by inputting an unknown poster image into the learning model.

The deep learning model created above is stored in, for example, the HDD 104, and the impression estimation unit 218 loads the deep learning model stored in the HDD 104 into the RAM 103 and executes it.

The impression estimation unit 218 converts the poster data acquired from the layout unit 217 into an image of the poster and estimates the impression of the poster by causing the CPU 101 or the GPU 109 to operate the deep learning model loaded in the RAM 103. Although the deep learning method is used in the present embodiment, the method is not limited to the deep learning. For example, in a case where a machine learning method such as a decision tree is used, feature values such as an average luminance value, an edge value, and/or the like are extracted from the poster image using image analysis, and a machine learning model may be created which estimates the impression based on these feature values.

FIG. 9 is a flowchart illustrating a poster creation process performed by the poster creation unit 210 of the poster creation application. As described above, the flowchart shown in FIG. 9 is started when the user sets various setting items on the poster creation application and presses the OK button.

The flowchart shown in FIG. 9 is realized, for example, by the CPU 101 loading a program stored in the HDD 104 into the RAM 103 and executing the program. In the present embodiment, it is assumed that each step of the flow is executed by components shown in FIG. 2 which are realized by the CPU 101 by executing the poster creation application. Referring to FIG. 9, the poster creation process is described below. Note that the symbol "S" in the description of each process indicates a step in the flowchart (the same applies hereinafter in this specification).

In S901, the poster creation application displays the application start screen 501 on the display 105. The user inputs each setting using the keyboard 106 or the pointing device 107 via a UI screen of the application start screen 501.

In S902, the poster creation condition specification unit 201, the text specification unit 202, the image specification unit 203, and the target impression specification unit 204 respectively acquire corresponding settings from the application start screen 501.

In S903, the skeleton selection unit 214, the color scheme pattern selection unit 215, and the font selection unit 216 respectively determine the number of skeletons, the number of color scheme patterns, and the number of fonts to be selected according to the number of posters to be created specified by the poster creation condition specification unit 201. In the present embodiment, using a method described later, the layout unit 217 generates poster data for the specified number of skeletons×the specified number of color scheme patterns×the specified number of fonts. The number of skeletons, the number of color scheme patterns, and the number of fonts are set such that the number of posters created here is greater than the number of posters to be created. In the present embodiment, the number of skel-etons, the number of color scheme patterns, and the number of fonts are determined according to equation 1 shown below.

$$\text{The number of selections} = \lceil \sqrt[3]{\text{The number of creations} \times 2} \rceil \quad (1)$$

For example, when the number of posters to be created is 6, the number of selections is 3, the number of pieces of poster data to be generated by the layout unit 217 is 27, and the poster selection unit 219 selects 6 from them.

Thus, the poster selection unit 219 can select posters whose overall impression better matches to the target impression from among the generated poster data whose number of pieces is equal to or greater than the number of posters to be created.

In S904, the image acquisition unit 211 acquires the image data. More specifically, the image acquisition unit 211 reads the image file specified by the image specification unit 203 from the HDD 104 into the RAM 103.

In S905, the image analysis unit 212 executes an analysis process on the image data acquired in S904 to acquire information indicating a feature value. Examples of information indicating a feature value include meta information stored in an image and information indicating an image feature value that can be obtained by analyzing the image. These pieces of information are used in an object recognition process performed as the analysis process.

Note that in the present embodiment, the object recognition process is performed as the analysis process, but the analysis process is not limited to the object recognition process, and other analysis processes may be executed. Note that the process in S905 may be omitted. Details of the process performed in S905 by the image analysis unit 212 are described below.

The image analysis unit 212 executes the object recognition process on the image acquired in S904. Here, a known method can be used for the object recognition process. In the present embodiment, an object is recognized by a discriminator generated by deep learning. The discriminator outputs a likelihood value of 0 to 1 as to whether a certain pixel constituting the image is a pixel constituting each object, and recognizes that an object exists in the image when the likelihood value exceeding a certain threshold value. By recognizing the object image, the image analysis unit 212 can acquire the types and positions of objects such as faces, pets such as dogs and cats, flowers, food, buildings, ornaments, and landmarks.

In S906, the skeleton acquisition unit 213 acquires skeletons that meet various setting conditions. In the present embodiment, it is assumed that one skeleton is described in one file and stored in the HDD 104. The skeleton acquisition unit 213 sequentially reads skeleton files from the HDD 104 into the RAM 103, while keeping skeletons that meet the conditions in the RAM 103 and deleting skeletons that do not meet the conditions from the RAM 103. FIG. 9B shows a flowchart of a condition judgement process performed by the skeleton acquisition unit 213. The condition determination processing of the skeleton acquisition unit 213 is described below with reference to FIG. 9B.

In S921, the skeleton acquisition unit 213 determines whether the size of each poster stored into the RAM 103 matches the poster size specified by the poster creation condition specification unit 201. Although in this example it is checked whether the sizes match, it may be checked only whether aspect ratios match. In this case, the skeleton acquisition unit 213 acquires a skeleton whose size matches the poster size specified by the poster creation condition specification unit 201 when the coordinate system of the read skeleton is properly increased or reduced.

In S922, the skeleton acquisition unit 213 determines whether the purpose category specified by the poster creation condition specification unit 201 matches the category of the skeleton. For skeletons that are used only for a specific purpose, the purpose categories thereof are described in the skeleton files such that the skeletons are not acquired unless the corresponding purpose category is selected. When a skeleton is specifically designed for a specific purpose, for example, as in a case where a graphic image representing school is drawn on a skeleton or as in a case where a graphic image of sports equipment or the like is drawn on a skeleton, such a skeleton is allowed to be used only for the specific purpose and is prevented from being used for other categories. Note that in a case where the application category is not set on the application start screen 501, S922 is skipped.

In S923, the skeleton acquisition unit 213 determines whether the number of read-in image objects of the skeleton is equal to the number of images acquired by the image acquisition unit 211.

In S924, the skeleton acquisition unit 213 determines whether the text object of the read-in skeleton is matches the text information specified by the text specification unit 202. More specifically, it is determined whether the type of the text information specified by the text specification unit 202 exists on the skeleton. For example, assume that text strings are specified in the title box 502 and the main text box 504 on the application start screen 501 and a blank is specified in the subtitle box 503. In this case, all text objects in the skeleton are searched, and if a text object whose type is set as "title" in the metadata and a text object whose type is set as "text" in the metadata are both found, it is determined that the skeleton is suitable, but otherwise it is determined that the skeleton is unsuitable.

As described above, the skeleton acquisition unit 213 keeps in the RAM 103 skeletons that match all set conditions in terms of the skeleton size, the purpose category, the number of image objects, and the type of the text object. Although the skeleton acquisition unit 213 checks all skeleton files stored in the HDD 104 in the present embodiment, this is only by way of example and not limitation. For example, the poster creation application may store in the HDD 104 a database that associates file paths of skeleton files with search conditions (the skeleton size, the number of image objects, and types of text objects). In this case, the skeleton acquisition unit 213 searches the database for skeleton files that match the conditions, and the skeleton acquisition unit 213 reads only skeleton files found in the search from the HDD 104 into the RAM 103, which allows it to acquire the skeleton files at a high speed. Referring again to FIG. 9A, the description is continued.

In S907, the skeleton selection unit 214 selects, from the skeletons acquired in S906, skeletons that match the target impression specified by the target impression specification unit 204. FIGS. 10A to 10C are diagrams illustrating a method of selecting skeletons by the skeleton selection unit 214. FIG. 10A is a diagram illustrating an example of a table that associates skeletons with impressions. In FIG. 10A, skeleton file names are described in a skeleton name column. The luxury, familiarity, dynamism, and stateliness columns describe numerical values that indicate the degree to which the respective skeletons contribute to the respective impressions. The values correspond to impressions such that −2 corresponds to "low", −1 to "rather low", 0 to "neutral", +1 to "rather high", and +2 to "high".

First, the skeleton selection unit 214 calculates the distance between the target impression acquired from the target impression specification unit 204 and each impression described in a skeleton impression table shown in FIG. 10A. For example, in a case where the target impression is specified as "luxury=+1, familiarity=−1, dynamism=−2, and stateliness=+2", the distances are calculated by the skeleton selection unit 214 as shown in FIG. 10B. Note that in the present embodiment, the distance is expressed in the Euclidean distance (note that hereinafter, the distance is expressed in the Euclidean distance unless otherwise specified). The smaller the distance, the closer the estimated impression is to the target impression. Next, the skeleton selection unit 214 selects the top N skeletons with the shortest distance values shown in FIG. 10B. In the present embodiment, the skeleton selection unit 214 selects the top two skeletons. That is, skeleton selection unit 214 selects the skeleton #1 and the skeleton #4.

Note that N may be set to a fixed value, or may be variable according to the condition specified by the poster creation condition specification unit 201. For example, in a case where the number of posters to be created is specified as 6 in the box 514 for specifying the number of posters to be created on the application start screen 501, the poster creation unit 210 creates 6 posters. The layout unit 217, which will be described later, generates a poster by combining a skeleton, a color scheme pattern, and a font respectively selected by the skeleton selection unit 214, the color scheme pattern selection unit 215, and the font selection unit 216. For example, in a case where two skeletons, two color scheme patterns, and two fonts are selected, a total of as many posters as 2×2×2=8 are created, which satisfies the condition that the number of posters to be created is 6. As described above, the number of skeletons N to be selected may be determined according to the conditions specified by the poster creation condition specification unit 201.

Note that the value range of each impression in the skeleton impression table in FIG. 10A is not necessarily needed to be equal to the value range of the impression specified by the target impression specification unit 204. In the present embodiment, the impression is specified by the target impression specification unit 204 in the value range from −2 to +2, but the value range in the skeleton impression table may be different from this value range. In this case, the distance described above is calculated after the value range of the skeleton impression table is scaled to match that of the target impression. The distance calculated by the skeleton selection unit 214 is not limited to the Euclidean distance, and any distance such as the Manhattan distance, the cosine similarity, or the like may be used as long as it is possible to calculate the distance between vectors. In a case where the radio button 517 is set to be OFF to disable a specific target impression, the calculation of the distance of that impression is not performed.

The skeleton impression table can be generated by, for example, creating poster images based on respective skeletons for the fixed color scheme pattern, font, image and text data to be placed on the skeletons, and estimating the impressions of the poster images. The generated skeleton impression table is stored in the HDD 104. That is, by estimating the impressions of poster images that use the same text colors, images, etc., but are different in the layout of the text and/or the images, it is possible to describe the characteristics relative to other skeletons in the table. In the describing of the characteristics in the table, it is desirable to normalize the impressions based on the overall impression. That is, it is desirable to perform a process to cancel the effects of the used color scheme patterns, images, etc. on the impressions by averaging the impressions of a plurality of poster images created using the plurality of color scheme patterns, images, etc. from the one skeleton. This makes it possible to tabulate the impact of the positions on the impression. For example, it is possible to describe that in the case of the skeleton with a small image, the impression is determined by graphic elements or text elements independent of images, or that the tilted placement of images or text provides strong dynamism. FIG. 10C illustrates examples of skeletons respectively corresponding to skeletons #1 to #4 shown in FIG. 10A. For example, in skeleton #1, image objects and text objects are regularly arranged, and the area of the image is small, and thus the dynamism is low. In skeleton #2, the graphic object and the image object are circular, and thus the familiarity is high but the stateliness is low. In skeleton #3, a large image object is placed over a large area and a tilted graphic object is superimposed on the image object, and thus a high dynamism is obtained. In skeleton #4, an image is placed over the entire skeleton, and a text object is placed in a minimized area, and thus a high stateliness is obtained but dynamism is low. As described above, in a case where a poster image includes characters or images, poster images with different target impressions are created depending on how the characters or images are arranged. Note that the method of generating the skeleton impression table is not limited to that described above. The impressions may be estimated from features of placement information such as areas and/or coordinates of images or title text. Furthermore, the impressions may be manually adjusted. The skeleton impression table is stored in the HDD 104, and the skeleton selection unit 214 reads out the skeleton impression table from the HDD 104 into the RAM 103 and refers to it.

In S908, the color scheme pattern selection unit 215 selects a color scheme pattern that matches the target impression specified by the target impression specification unit 204. The color scheme pattern selection unit 215 refers to the color scheme pattern impression table corresponding the color scheme pattern, as in S906, and selects a color scheme pattern according to the target impression. FIG. 11A illustrates an example of a color scheme pattern impression table that associates color scheme patterns with impressions. The color scheme pattern selection unit 215 calculates the distance between the target impression and the impressions described in the luxury to stateliness columns in FIG. 11A for each color scheme pattern, and selects the top N color scheme patterns with the smallest distance. In the present embodiment, the top two color scheme patterns are selected Like the skeleton impression table, the color scheme pattern impression table is obtained by creating posters with various color scheme patterns while fixing the skeleton, the font, and the image and estimating the impressions of the resultant posters and tabulating the impression tendencies of the color scheme patterns.

In S909, the font selection unit 216 selects a combination of fonts that match the target impression specified by the target impression specification unit 204. The font selection unit 216 refers to the impression table corresponding to the font, as in S906, and selects a font according to the target impression. FIG. 11B illustrates an example of a front impression table that associates fonts with impressions. The font selection unit 216 calculates the distance between the target impression and the impressions described in the luxury to stateliness columns in FIG. 11B for each font, and selects the top N fonts with the smallest distance. Like the skeleton impression table, the font impression table is obtained by creating posters using various fonts while fixing the skeleton, the color scheme pattern, and the image and estimating the impressions of the resultant posters and tabulating the impression tendencies of the fonts.

In S910, the layout unit 217 sets text information, images, color schemes, and fonts for the skeleton selected by the skeleton selection unit 214, and creates a poster.

Figure 12:
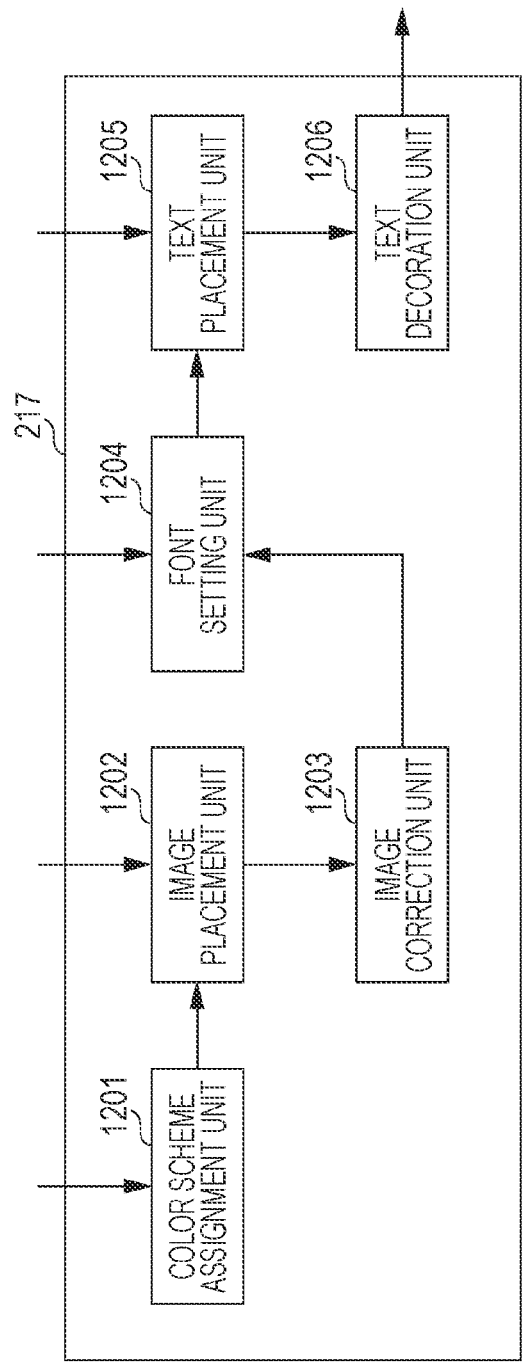
FIG. 12 is a software block diagram illustrating details of a layout unit.
Figure 13:
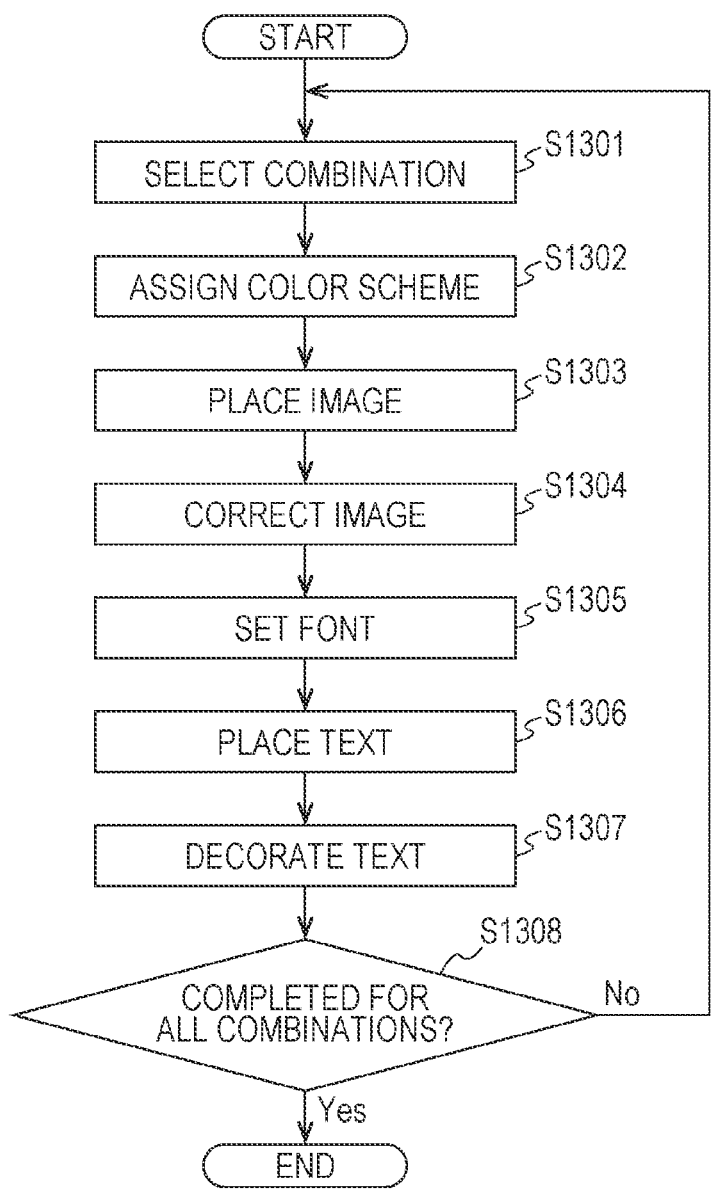
FIG. 13 is a flowchart illustrating a layout process.
Figures 14A, 14B, 14C:
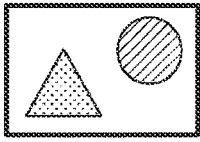
FIGS. 14A to 14C are diagrams illustrating inputs to a layout unit.
Figure 15A:
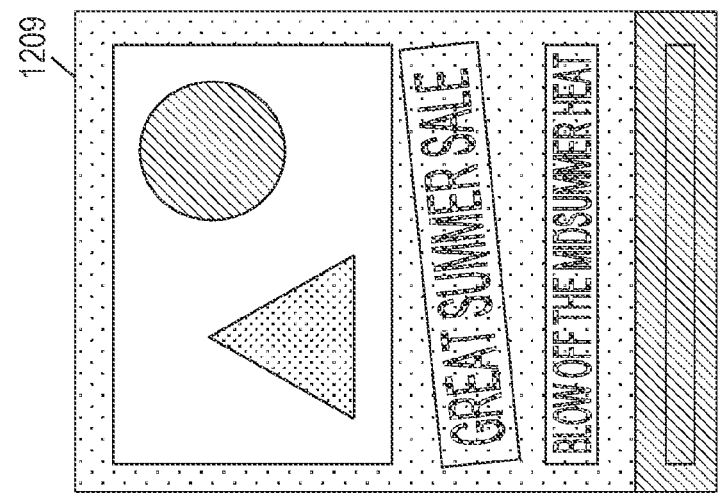
FIGS. 15A to 15C are diagrams for illustrating an operation of a layout unit.
Figure 15B:
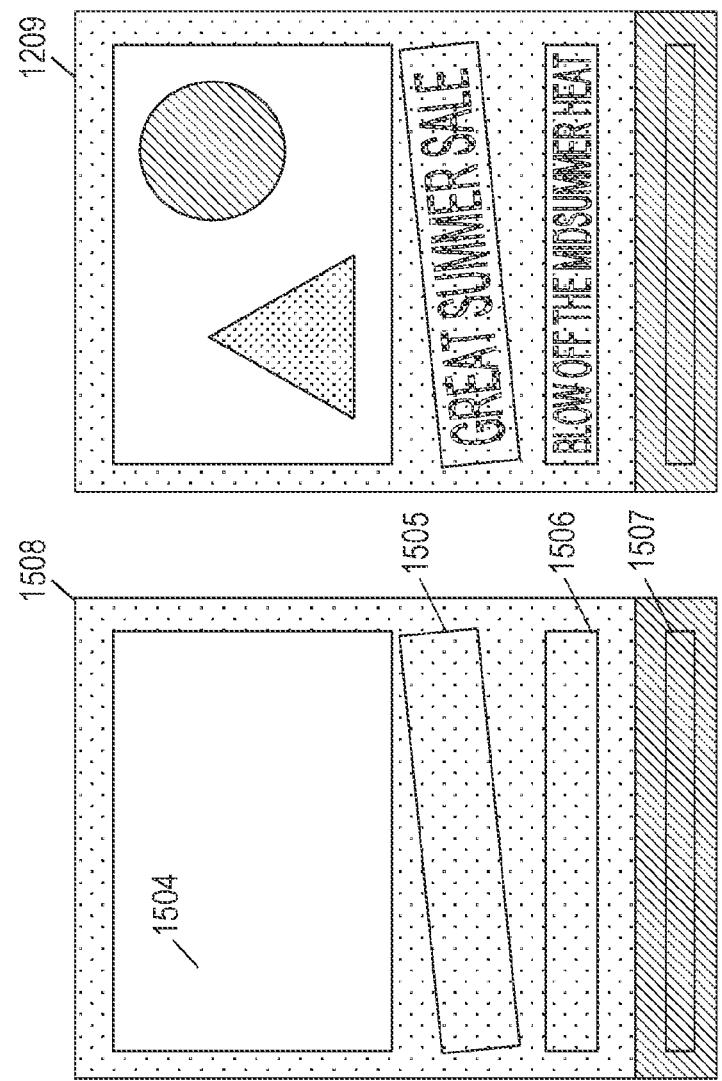
Figure 15C:
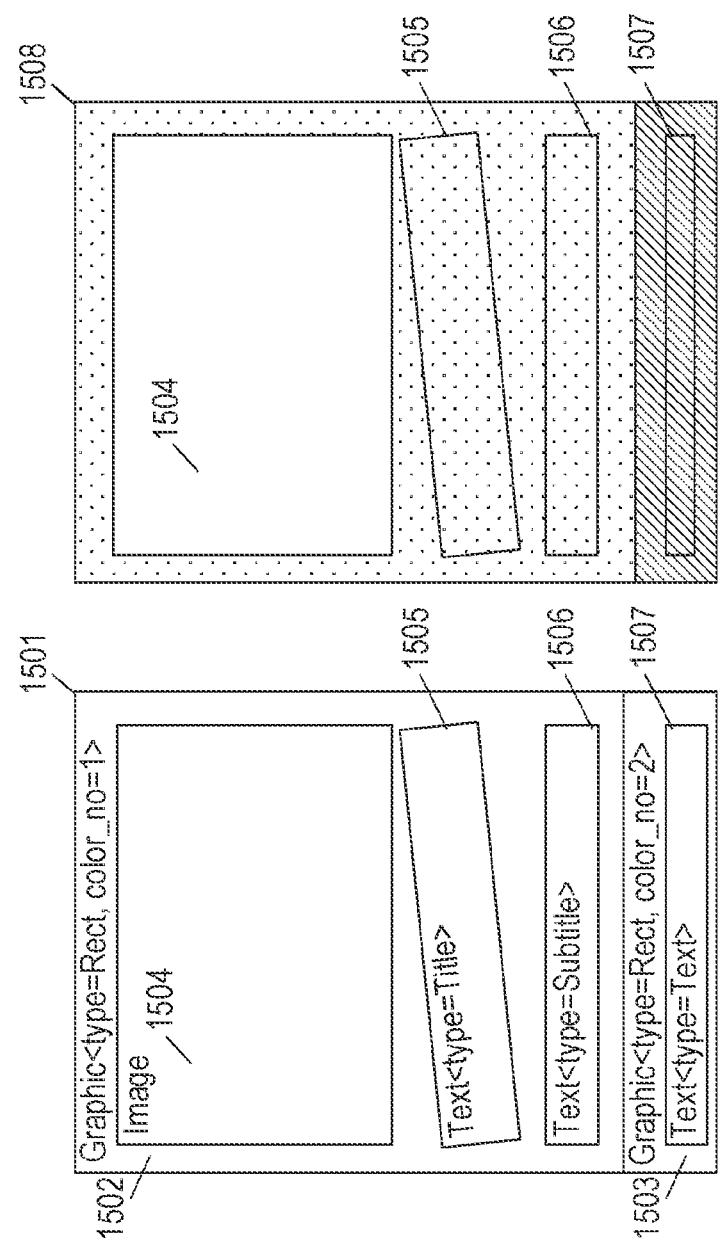

The process in S910 and the process of the layout unit 217 are described in detail below with reference to FIG. 12, FIG. 13, FIGS. 14A to 14C, and FIGS. 15A to 15C. FIG. 12 is a software block diagram illustrating details of the layout unit 217. The layout unit 217 includes a color scheme assignment unit 1201, an image placement unit 1202, an image correction unit 1203, a font setting unit 1204, a text placement unit 1205, and a text decoration unit 1206. FIG. 13 is a flowchart illustrating the details of the process in S910. FIGS. 14A to 14C are diagrams illustrating information input to the layout unit 217. FIG. 14A is a table summarizing text information specified by the text specification unit 202 and images specified by the image specification unit 203. FIG. 14B illustrates an example of a table indicating color scheme patterns acquired by the color scheme pattern selection unit 215. FIG. 14C illustrates examples of fonts acquired from the font selection unit 216. FIGS. 15A to 15C are diagrams for illustrating processing steps performed by the layout unit 217.

First, referring to FIG. 13, the process in S910 is described in detail below.

In S1301, the layout unit 217 lists all combinations of skeletons acquired from the skeleton selection unit 214, color scheme patterns acquired from the color scheme pattern selection unit 215, and fonts acquired from the font selection unit 216. The layout unit 217 sequentially creates poster data for each combination in following layout processing. For example, in a case where the number of skeletons acquired from the skeleton selection unit 214 is 3, the number of color scheme patterns acquired from the color scheme pattern selection unit 215 is 2, and the number of fonts acquired from the font selection unit 216 is 2, the layout unit 217 generates as many pieces of poster data as 3×2×2=12. Next, in S1301, the layout unit 217 selects one combination from the list of combinations, and executes the processes in S1302 to S1307.

In S1302, the color scheme assignment unit 1201 assigns color scheme patterns acquired from the color scheme pattern selection unit 215 to the skeletons acquired from the skeleton selection unit 214.

FIG. 15A is a diagram illustrating an example of a skeleton. In the following description of the present embodiment, it is assumed by way of example that a color scheme pattern with a color scheme ID of 1 shown in FIG. 14B is assigned to a skeleton 1501 shown in FIG. 15A. The skeleton 1501 in FIG. 15A includes two graphic objects 1502 and 1503, one image object 1504, and three text objects 1505 to 1507. First, the color scheme assignment unit 1201 assigns color schemes to the graphic objects 1502 and 1503. More specifically, based on a color scheme number described in metadata of each graphic object, a color of a color scheme pattern is assigned. For example, in a case where metadata of a text object indicates that the type is "title", the color scheme assignment unit 1201 assigns, for example, the last color of the color scheme pattern to this text object. That is, in the present example, the color #4 is assigned to the text object 1505. Next, the text color for text placed on text objects other than those whose type is specified as "title" in the metadata is set based on the brightness of the background of the text objects. In the present embodiment, if the brightness of the background of the text object is lower than or equal to a threshold value, white is assigned to the text color, but otherwise black is assigned to the text color. FIG. 15B is a diagram showing the state of the skeleton 1508 after the color scheme assignment described above is performed. The color scheme assignment unit 1201 outputs the color-assigned skeleton data to the image placement unit 1202.

In S1303, the image placement unit 1202 places the image data acquired from the image analysis unit 212 on the skeleton data acquired from the color scheme assignment unit 1201 based on the accompanying analysis information. In this example, the image placement unit 1202 assigns the image data 1401 to the image object 1504 on the skeleton. In a case where the image object 1504 and the image data 1401 have different aspect ratios, the image placement unit 1202 performs trimming such that the aspect ratio of the image data 1401 is equal to the aspect ratio of the image object 1504. More specifically, based on the object position obtained as a result of analyzing the image data 1401 by the image analysis unit 212, the trimming is performed so as to minimize the reduction in the object area caused by the trimming. Note that the trimming method is not limited to this, and other trimming methods may be used. For example, the center of the image may be trimmed, or a composition is devised such that the face position is in a triangular composition, or the like. The image placement unit 1202 outputs the resultant image-assigned skeleton data to the image correction unit 1203.

In S1304, the image correction unit 1203 acquires the image-assigned skeleton data from the image placement unit 1202, and corrects the images placed on the skeleton. In the present embodiment, when the image resolution is insufficient, upsampling is performed using super-resolution processing. First, the image correction unit 1203 determines whether the images placed on the skeleton satisfy a predetermined resolution. For example, in a case where an image of 1600 pixels×1200 pixels is assigned to an area of 200 mm×150 mm on the skeleton, the print resolution of the image that will be obtained when the image is printed can be calculated according to equation 2.

$$\frac{1600}{200 \div 25.4} \approx 203 \, [dpi] \qquad (2)$$

Next, in a case where it is determined that the print resolution of the image is lower than a threshold value, the image correction unit 1203 increases the resolution by performing super-resolution processing. However, in a case where it is determined that the print resolution of the image is greater than or equal to the threshold value and thus the resolution is sufficient, no particular image correction is performed. In the present embodiment, the super-resolution processing is performed when the print resolution is lower than 300 dpi.

In S1305, the font setting unit 1204 sets the font acquired from the font selection unit 216 to the image-corrected skeleton data acquired from the image correction unit 1203. FIG. 14C shows an example of a combination of fonts selected by the font selection unit 216. In the following description of the present example, it is assumed that the font with a font ID of 2 shown in FIG. 14C is assigned to the image-corrected skeleton data. In this example, fonts are set for the text objects 1505, and 1506, and 1507 of the skeleton 1508. As for fonts of posters, in many cases, a conspicuous font is used for titles to provide high visual attractiveness, while an easy-to-read font is used for other types of text to provide high visibility. Therefore, in the present embodiment, the font selection unit 216 selects two types of fonts, that is, a title font and a text font. The font setting unit 1204 sets the title font for the text object 1505 whose type is title, and sets the text font for the other text objects 1506 and 1507. The font setting unit 1204 outputs the font-set skeleton data to a text placement unit 1205. In the present embodiment, the font selection unit 216 selects two types of fonts, but this is only by way of example and not limitation. For example, only the title font may be selected. In this case, the font setting unit 1204 uses a font corresponding to the title font as the text font. That is, for example, in a case where a Gothic family font is used for the title, a Gothic family font that is highly readable may be used for other types of text objects, while in a case where a Mincho family font is used for the title, a Mincho family font may be used for other types of text objects, and so on. Of course, the title font and the text font may be the same. Alternatively, different fonts may be used depending on how prominent the text objects are to be. For example, the title font is used for the title text object and subtitle text objects, the text font is used for the other text objects, the title font is used for text objects described in fonts with a size greater than or equal to a predetermined value.

In S1306, the text placement unit 1205 places the text specified by the text specification unit 202 on the font-set skeleton data acquired from the font setting unit 1204. In the present embodiment, each text shown in FIG. 14A is assigned according to the attribute described in the metadata of each text object of the skeleton. More specifically, "GREAT SUMMER SALE" whose attribute is title is assigned to the text object 1505, and "BLOW OFF THE MIDSUMMER HEAT" whose attribute is subtitle is assigned to the text object 1506. Nothing is set to the main text, and thus nothing is assigned to the text object 1507. FIG. 15C shows a skeleton 1509, which is an example of skeleton data processed by the text placement unit 1205. The text placement unit 1205 outputs the skeleton data to which the text has been placed to a text decoration unit 1206.

In S1307, the text decoration unit 1206 decorates the text object in the text-placed skeleton acquired from the text placement unit 1205. In the present embodiment, if the color difference between the characters of the title and its background area is smaller than or equal to a threshold value, a process is performed to border the characters of the title. This improves the readability of the title. The text decoration unit 1206 outputs the decorated skeleton data, that is, the poster data that has been completely laid out to the impression estimation unit 218.

In S1308, the layout unit 217 determines whether all poster data has been generated. In a case where the layout unit 217 determines that poster data has been generated for all combinations of skeletons, color scheme patterns, and fonts, the layout unit 217 ends the layout processing and advances the processing flow to S911. In a case where it is determined that the poster data has not been generated for all combinations, the processing flow returns to S1301 to generate poster data for a combination that has not yet been subjected to the generation.

The process in S910 has been described above. Referring again to FIG. 9A, the description is continued.

In S911, the impression estimation unit 218 renders each piece of poster data acquired from the layout unit 217, and associates the estimated impression obtained by estimating the impression of the rendered poster image with the poster data. Note that the rendering process is a process of converting poster data into image data. For example, even if the color scheme pattern is the same, the layout can change depending on the skeleton, and thus which color is actually used in how large an area is different depending on the skeleton. Therefore, it is necessary to evaluate the final overall impression of the poster as well as the individual impressions of the color scheme patterns and skeletons. Therefore, this process is performed at this timing.

This makes it possible to evaluate not only the impression of individual elements of the poster such as color schemes and positions, but also the impression of the final poster including laid images and characters.

In S912, the poster selection unit 219 selects a poster to be output to the display 105 (thereby being presented to the user) based on the poster data and the associated estimated impression acquired from the impression estimation unit 218. In the present embodiment, the poster selection unit 219 selects a poster in which the value of the distance between the target impression and the estimated impression of the poster is smaller than or equal to a predetermined threshold value.

Note that in the present embodiment, the distance is expressed in the Euclidean distance. The smaller the Euclidean distance, the closer the estimated impression is to the target impression. The distance calculated by the poster selection unit 219 is not limited to the Euclidean distance, and any distance such as the Manhattan distance, the cosine similarity, or the like may be used as long as it is possible to calculate the distance between vectors.

In a case where the number of selected posters is less than the number of posters to be created specified by the poster creation condition specification unit 201, the poster selection unit 219 further selects a missing number of posters in ascending order of the value of the distance between the target impression and the estimated impression of the poster. In the present embodiment, the poster selection unit 219 also selects the missing posters, but this is by way of example and not limitation. For example, in a case where the number of posters selected by the poster selection unit 219 is less than the number of posters to be created, the preview screen 601 may display that the number of posters is insufficient. Alternatively, the poster selection unit 219 may select the missing posters and display them on the preview screen 601 such that the posters whose value of the distance between the target impression and the estimated impression is less than or equal to the threshold value can be distinguished from the posters whose value of the distance is greater than the threshold value. Still alternatively, in the case where the number of selected posters is insufficient, the process may return to S903 and increase the number of selected skeletons, color scheme patterns, and fonts.

In S913, the poster display unit 205 renders the poster data selected by the poster selection unit 219 and outputs the resultant poster image to the display 105. That is, the preview screen 601 in FIG. 6 is displayed.

Above is described the process of creating the posters according to the impression specified by the user.

As described above, according to the present embodiment, it is possible to create a poster that expresses the impression desired by the user. More specifically, in the present embodiment, a plurality of variations of poster candidates can be created according to the target impression by combining elements that make up the posters, such as skeletons, color scheme patterns, and fonts, based on the target impression. Furthermore, by estimating the overall impression of the poster and selecting a poster with an impression close to the target impression from the one or more candidate posters, it is possible to create a poster that meets the user's intentions in terms of not only individual elements, but also the overall impression. More specifically, for example, assume that the target impression is specified on the application start screen 501 such that −1 is set to luxury, +1 is set to familiarity, and dynamism and stateliness are disabled. In this case, for example, the poster image 602 on the preview screen 601 is generated such that the luxury value is −1.2, the familiarity value is +0.9, the dynamism value is +0.2, and the stateliness value is −1.3, and thus the estimated impression is close to the target impression.

First Modification of First Embodiment

In the first embodiment described above, the target impression is set by using the impression sliders 508 to 511 on the application start screen 501 as objects for setting the target impression, but the method for setting the target impression is not limited to this.

Referring to FIGS. 16A to 16D, examples of UIs for setting a target impression are described. FIG. 16A illustrates an example of setting a target impression with a UI on a radar chart. By operating a handle 1601 on the radar chart in FIG. 16A, the target impression can be set along each axis. The target impression specification unit 204 acquires a target impression, for example, such that −2 is obtained when the handle 1601 is at the center of the UI, and +2 is obtained when it is at an outermost position. In the example shown in FIG. 16A, the target impressions are specified such that luxury=+0.8, familiarity=+1.1, dynamism=−0.1, and stateliness=−0.7. As in this example, the target impression may be expressed as a decimal fraction. FIG. 16B shows an example of a radar chart in which some target impressions are disabled. For example, if the user double-clicks the handle 1601 with the pointing device 107, the target impression of the axis on which the handle 1601 is located is disabled and hidden. When the user clicks again the axis 1602 of the radar chart with the pointing device 107, the target impression is enabled and is displayed. In the example in FIG. 16B, although dynamism is disabled, the target impression is the same as that in FIG. 16A, except for dynamism.

FIG. 16C shows an example of a UI for setting a target impression based on images instead of words. In a sample poster display area 1603, poster images 1604 to 1607 are arranged that differ greatly from each other with respect to an impression item. A check box 1608 is displayed for each poster image. If the user turns on a check box 1608 by clicking a poster that is close to a poster the user wants to create by using the pointing device 107, the poster is selected. The target impression specification unit 204 determines the target impression by referring to the impression corresponding to the selected poster image.

FIG. 16D illustrates a table representing impressions corresponding to the poster images 1604 to 1607 shown in FIG. 16C and final target impressions. The luxury, familiarity, dynamism, and stateliness columns describe numerical values that indicate the degree to which the poster image contributes to each impression. For example, assume that poster images 1604 and 1607 are selected as shown in FIG. 16C. In this case, the target impression specification unit 204 determines, as the impression, an impression obtained as a result of synthesizing the impressions of the poster images 1604 and 1607. In this example, among the factors corresponding to the selected poster images, the value having the maximum absolute value is taken as the value of each factor of the target impression. Although the example described above presents a poster image with a maximum impression value, this is by way of example and not limitation. For example, a poster image may be used in which a plurality of impressions have large values, or poster images may be presented such the number of presented poster images is equal to or greater than the number of impressions. This allows the user to intuitively specify the target impression based on the actual posters instead of using words.

Second Embodiment

In the first embodiment described above, constituent elements of a poster such as a skeleton, a color scheme pattern, and a font are selected based on an image and a target impression, and the poster is created using the selected elements. In a second embodiment described below, a combination generation unit searches, according to a genetic algorithm, for a combination of constituent elements of a poster that gives an overall impression of the poster close to a target impression. This makes it possible to more flexibly select optimal poster constituent elements for the target impression without pre-calculating a skeleton impression table, a color scheme pattern impression table, or a font impression table.

Figure 17:
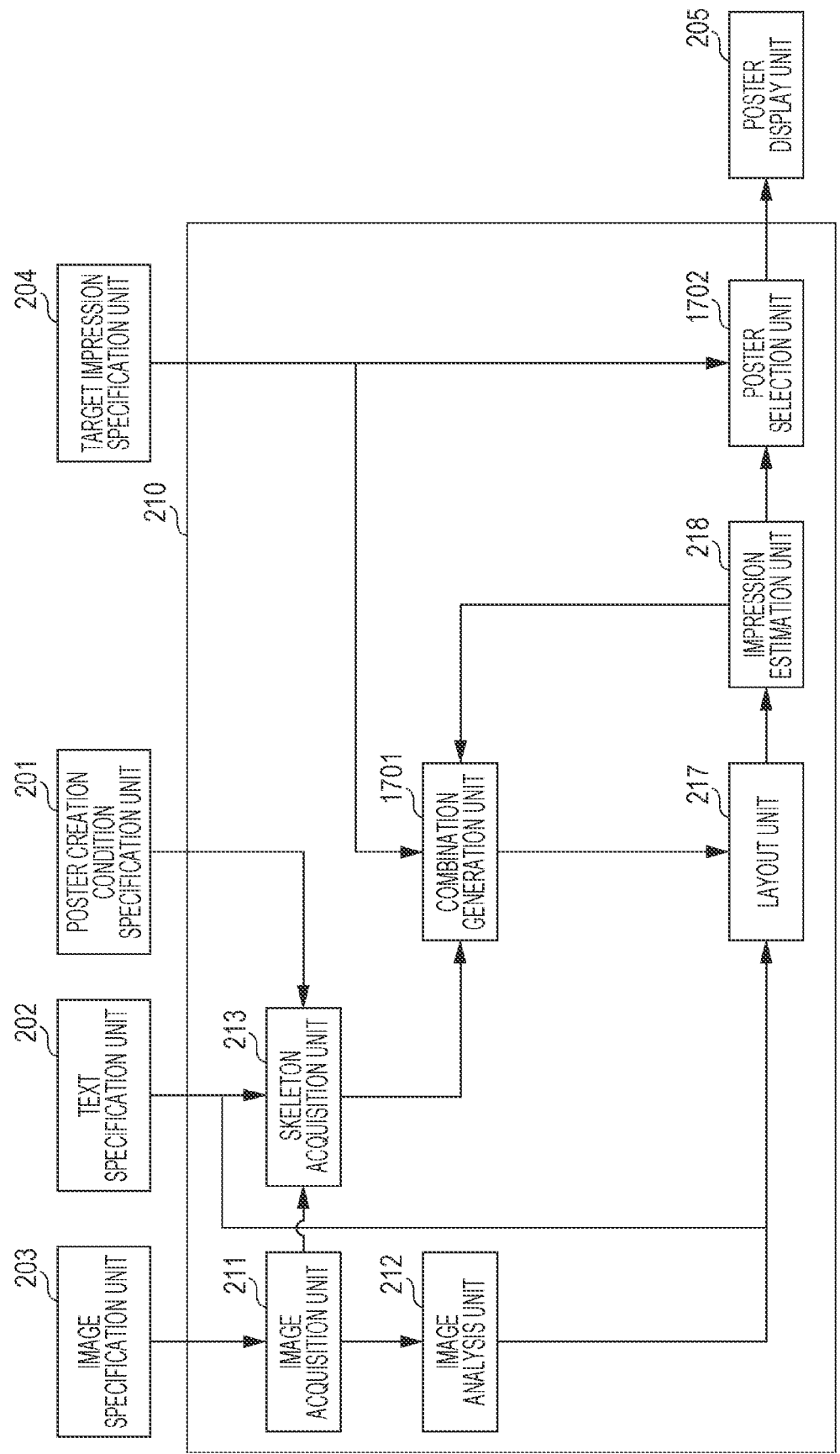
FIG. 17 is a software block diagram of a poster creation application.

FIG. 17 is a software block diagram of a poster creation application according to a second embodiment. In the configuration of the block diagram shown in FIG. 17, a combination generation unit 1701 is used instead of the skeleton selection unit 214, the color scheme pattern selection unit 215, and the font selection unit 216 shown in FIG. 2. The constituent elements assigned the same reference numbers as those in FIG. 2 perform the same processing as the processing according to the first embodiment described above, and therefore a duplicate description thereof is omitted.

The combination generation unit 1701 acquires one or more skeletons from the skeleton acquisition unit 213, poster data and estimated poster impression from the impression estimation unit 218, a target impression from the target impression specification unit 204. The combination generation unit 1701 also acquires a list of color scheme patterns and fonts from the HDD 104. The combination generation unit 1701 generates a combination of constituent elements of a poster (skeletons, color scheme patterns, fonts) used for poster creation. The combination generation unit 1701 outputs the generated combination of poster constituent elements to the layout unit 217.

The poster selection unit 1702 selects a poster whose distance between the estimated impression of the poster and the target impression specified by the target impression specification unit 204 is smaller than or equal to a threshold value from the poster data acquired from the impression estimation unit 218, and stores the selected poster in the RAM 103. The poster selection unit 1702 determines whether the number of selected and stored posters reaches the number of posters to be created specified in the box 514 for specifying the number of posters to be created.

FIG. 18 is a flowchart illustrating a process performed by the poster creation unit 210 of the poster creation application according to the present embodiment. Among the processing steps in this flowchart, the processing steps assigned the same step numbers as those in the flowchart shown in FIG. 9 are similar to the processing steps described in the first embodiment, and thus a further description thereof is omitted. Note that in the process according to this flowchart, S903 and S907 to S909 shown in FIG. 9 are omitted.

The process in S1801 is described below for two cases: the process is executed for the first time; and the process is executed in a second and subsequent executions in an iterative calculation loop. First, when S1801 is executed for the first time, the combination generation unit 1701 acquires tables of skeletons, color schemes, and fonts used for poster creation. FIGS. 19A to 19D show tables used by the combination generation unit 1701. FIG. 19A shows a list of skeletons acquired by the combination generation unit 1701 from the skeleton acquisition unit 213. FIGS. 19B and 19C show, respectively, a list of fonts and a list of color schemes acquired by the combination generation unit 1701 from the HDD 104. The combination generation unit 1701 generates random combinations from the three tables described above. In the present embodiment, 100 combinations are generated. FIG. 19D shows a combination table generated according to the present embodiment.

After that, the combination generation unit 1701 performs the processes in S910, S911, and S1802 for all the generated combinations.

In S1801 in second and subsequent executions in the iterative calculation loop, the combination generation unit 1701 calculates the value of the distance between the target impression and the estimated poster impression acquired from the impression estimation unit 218, and associates the calculated distance with the combination table. FIG. 20 is a diagram for explaining the process in S1801 performed in second and subsequent executions in the iteration. FIG. 20A shows a table obtained as a result of associating the value of the distance between the target impression and the estimated impression of the poster to the table shown in FIG. 19D. More specifically, the layout unit 217 creates a poster based on the combination table shown in FIG. 19D, and the impression estimation unit 218 estimates the impression of each created poster. The distance column in FIG. 20A describes the value of the distance between the target impression and the estimated impression of the poster created for the combination indicated in the corresponding row. The combination generation unit 1701 generates a new combination table from FIG. 20A. FIG. 20B shows a newly generated combination table. In the present embodiment, the new combination is generated by tournament selection and uniform crossover in a genetic algorithm. In this process, first, N combinations are randomly selected from the table shown in FIG. 20A. For example, N=3. Next, from among the selected combinations, the top two combinations with the shortest distance (that provides impressions close to the target impression) are selected. Finally, a new combination is generated by randomly replacing elements of the combinations (skeleton IDs, color scheme IDs, font IDs) across the two selected combinations. For example, combination IDs 1 and 2 in the table shown FIG. 20B result from the combination IDs 1 and 3 in FIG. 20A with the color scheme IDs interchanged. The total table shown in FIG. 20B is obtained as a result of generating new 100 combinations by repeatedly performing the procedure described above.

Thus, it becomes possible to efficiently search for a combination based on the value of the distance between the target impression and the estimated impression. Although 100 combinations are generated in the present embodiment, the number of combinations is not limited to 100. Furthermore, although the tournament selection and the uniform crossover are used, other methods such as ranking selection, roulette selection, and one-point crossover may be used. In addition, a mutation may be incorporated into the process to make it difficult to fall into a local optimum solution. Although skeletons (arrangements), color scheme patterns, and fonts are used as constituent elements of a poster to be searched, other constituent elements may be used. For example, a plurality of patterns may be prepared to be inserted into the background of a poster, and a determination as to which pattern to use and which not to use may be made by searching. By increasing the number of constituent elements to be searched, it becomes possible to create a greater variety of posters and increase the range of impressions of the posters.

In S1802, the poster selection unit 1702 calculates the value of the distance between the estimated poster impression and the target impression in the same manner as in S1801, and generates a table similar to that shown in FIG. 20A. The poster selection unit 1702 stores, in the RAM 103, the poster images whose value of the distance to the target impression is smaller than or equal to a threshold value.

In S1803, the poster selection unit 1702 determines whether the number of poster images stored in the RAM 103 in S1802 has reached the number of posters to be created specified in the box 514 for specifying the number of posters to be created. In a case where the poster selection unit 1702 determines that the number of poster images has reached the number of posters to be created, the poster selection unit 1702 ends the poster creation process, but otherwise the poster selection unit 1702 returns to S1801. That is, the second iteration processing from S1801 to S1802 is performed. The iteration processing is performed repeatedly until as many poster images with a distance to the target impression smaller than or equal to the threshold value as the specified number of posters to be created have been generated and stored in the RAM 103. When poster images with a distance to the target impression smaller than or equal to the threshold value are generated and stored and the number of poster images reaches or exceeds the specified number of posters to be created, the poster selection unit 1702 may compare the distance values of the stored poster images with each other and may finally keep only poster images with smaller distances in the RAM 103. In this case, poster images that are determined to have larger distance values as a result of the comparison may be deleted from the RAM 103.

In the present embodiment, the genetic algorithm is used to search for combinations of poster constituent elements, but the search method is not limited to this, and other search methods such as a neighborhood search method, a tab search method, or the like may be used.

As described above, according to the present embodiment, by searching for a combination of constituent elements to be used in a poster, it is possible to create a poster with an overall impression close to the target impression. This is particularly effective when a poster is created in accordance with an image and text information input by a user. For example, consider a case where it is desired to create a poster such that an image has a dynamic impression but the poster as a whole has a calm impression. In the present embodiment, it is possible to evaluate the overall impression of the poster and search for a combination of a skeleton, a color scheme pattern, and a font that provides an impression close to a target impression. Therefore, the elements of the poster may be controlled depending on the image. For example, to reduce the impact of a particular image, a skeleton with a small image area and/or a more subdued font or color scheme may be used. According to the present embodiment, it is possible to flexibly find a combination of constituent elements that are optimal for the overall impression of the poster, and it is possible to create posters various variations that are close to the target impression.

Third Embodiment

In the examples according to the first and second embodiments, a poster is created by controlling constituent elements of the poster based on the target impression. A third embodiment discloses an example in which templates obtained by combining skeletons, color scheme patterns, and fonts are prepared in advance, and a poster is created only by the layout unit setting an image and text information. This makes it possible to create a poster that matches the target impression by performing simpler processing.

Figure 21:
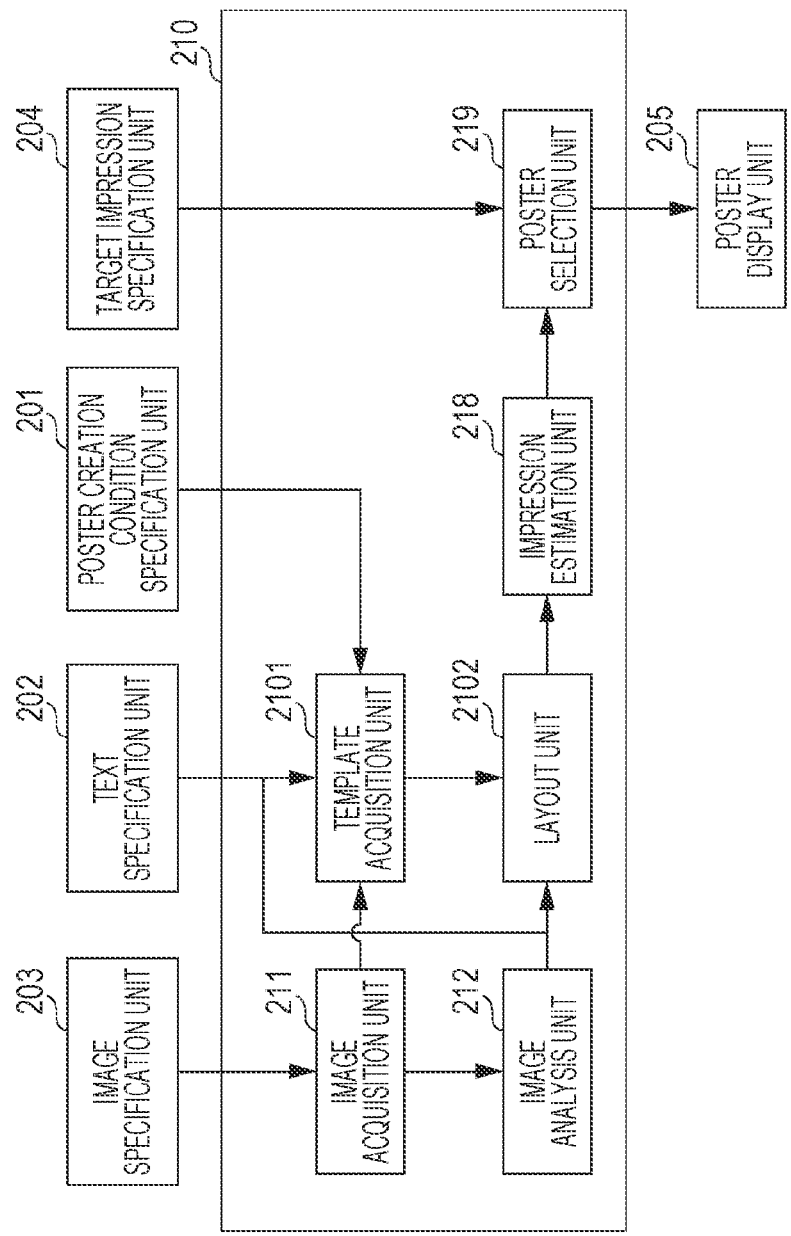
FIG. 21 is a software block diagram of a poster creation application.

FIG. 21 is a software block diagram of a poster creation application according to a third embodiment. In the configuration of the block diagram shown in FIG. 21, a template acquisition unit 2101 is used instead of the skeleton acquisition unit 213, the skeleton selection unit 214, the color scheme pattern selection unit 215, and the font selection unit 216 shown in FIG. 2. The constituent elements assigned the same reference numbers as those in FIG. 2 perform the same processing as the processing according to the first embodiment described above, and therefore a duplicate description thereof is omitted.

A template acquisition unit 2101 acquires from the HDD 104 one or more templates that meet the conditions specified by poster creation condition specification unit 201, the text specification unit 202, and the image acquisition unit 211. In the present embodiment, the template refers to a skeleton for which a color scheme and a font have been set in advance. The template acquisition unit 2101 outputs the acquired one or more templates to the layout unit 2102.

The layout unit 2102 creates poster data by laying out the image obtained from the image acquisition unit 211 and the text obtained from the text specification unit 202 on each template acquired from the template acquisition unit 2101. The layout unit 2102 outputs the created poster data to the impression estimation unit 218.

FIG. 22 is a flowchart illustrating a process performed by the poster creation unit 210 of the poster creation application according to the present embodiment. The constituent elements assigned the same reference numbers as those in FIG. 9 perform the same processing as the processing according to the first embodiment described above, and therefore a further duplicate description thereof is omitted. In the process according to this flowchart, S906 to S909 shown in FIG. 9 are omitted.

In S2201, a template acquisition unit 2101 acquires from the HDD 104 one or more templates that meet the conditions specified by poster creation condition specification unit 201, the text specification unit 202, and the image acquisition unit 211. In the present embodiment, the template refers to a skeleton for which a color scheme and a font have been set in advance. It is assumed that each template is described in one file and stored in the HDD 104.

The template acquisition unit 2101, like the skeleton acquisition unit 213, sequentially reads template files from the HDD 104 into the RAM 103, while keeping templates that meet the setting conditions in the RAM 103 and deleting templates that do not meet the conditions from the RAM 103. The template acquisition unit 2101 outputs the acquired one or more templates to the layout unit 2102.

In S2202, the layout unit 2102 creates poster data by laying out the image obtained from the image analysis unit 211 and the text obtained from the text specification unit 202 on each template acquired from the template acquisition unit 2101. The layout unit 2102 outputs the created one or more pieces of poster data to the impression estimation unit 218. The setting of the image is performed in a similar manner to that by the image placement unit 1202, and the setting of the text information is similar to that by the text placement unit 1205, and thus duplicate descriptions thereof are omitted.

As described above, according to the present embodiment, by preparing templates in advance on which various color schemes and fonts are set, it is possible to create a poster that provides an impression close to the target impression only by performing simple processing.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-104050 filed Jun. 28, 2022, which is hereby incorporated by reference herein in its entirety.

What is claimed is:

1. An information processing apparatus, comprising:
   at least one processor; and
   a memory that stores a program which, when executed by the at least one processor, causes the at least one processor to function as:
   an acceptance unit configured to accept from a user a target impression of a poster image to be created; and
   a creation unit configured to create the poster image based on the target impression,
   wherein information indicating a difference between an impression that the poster image created by the creation unit has and the specified target impression is less than a predetermined threshold value.

2. The information processing apparatus according to claim 1, further comprising a first display unit configured to display a screen for accepting the target impression from the user, wherein the acceptance unit accepts specifying the target impression displayed on the screen from the user.

3. The information processing apparatus according to claim 2, wherein
   the first display unit displays a slider on the screen as an object for specifying the target impression, and
   the acceptance unit accepts the target impression specified by operating the slider from the user.

4. The information processing apparatus according to claim 2, wherein
   the first display unit displays a radar chart on the screen as an object for specifying the target impression, and
   the acceptance unit accepts the target impression specified by operating the radar chart from the user.

5. The information processing apparatus according to claim 1, wherein the target impression is determined by a combination of factors indicating the impression.

6. The information processing apparatus according to claim 1, wherein the poster image is created by changing a color scheme of the poster image to match a wide variety of the target impressions.

7. The information processing apparatus according to claim 1, wherein in a case where the poster image includes a character, the poster image is created by changing a font of the character to match a wide variety of the target impressions.

8. The information processing apparatus according to claim 1, wherein in a case where the poster image includes a character or an image, the poster image is created by changing a manner of arranging the character or the image to match a wide variety of the target impressions.

9. The information processing apparatus according to claim 1, wherein
   the poster image is created based on a skeleton which is information indicating arrangements of a character, an image, and a graphic on the poster image, and
   the poster image is created by changing the skeleton to match a wide variety of the target impressions.

10. The information processing apparatus according to claim 9, wherein the poster image is created by arranging a character and an image on a template that is prepared in advance as a combination of the skeleton with a color scheme and a font of the character in the poster image.

11. The information processing apparatus according to claim 9, wherein the poster image is created by selecting the skeleton that provides an impression close-similar to the target impression, and a color scheme and a font in the poster image, and based on a combination of the selected skeleton and the color scheme and the character font in the poster image.

12. The information processing apparatus according to claim 1, wherein the at least one processor further functions as a selection unit configured to select, in a case where a plurality of the poster images are created, as many or more poster images having an impression similar to the target impression from the plurality of the poster images as the number of posters to be created specified by a user, and
   a second display unit configured to display the poster images,
   wherein the second display unit displays as many or more poster images having an impression close to the target impression as the number of posters to be created specified by a user.

13. The information processing apparatus according to claim 12, wherein the selection unit selects a poster image created by the creation unit that corresponds to a value less than a predetermined threshold value in terms of information indicating a difference between an impression that the poster image has and the specified target impression.

14. The information processing apparatus according to claim 12, wherein the selection units selects poster images created by the creation unit that correspond to values less than a predetermined threshold value in terms of information indicating a difference between an impression that the poster image has and the specified target impression in ascending order of the information indicating the difference from the target impression.

15. A control method for an information processing apparatus, comprising:

accepting from a user a target impression of a poster image to be created, wherein the target impression is received from the user via a user interface (UI) entered through a display; and creating the poster image based on the target impression, wherein information indicating a difference between an impression that the poster image created by the creation unit has and the specified target impression is less than a predetermined threshold value.

16. A non-transitory computer-readable storage medium storing a program for causing a computer to execute a control method for an information processing apparatus comprising:

accepting from a user a target impression of a poster image to be created; and creating the poster image based on the target impression, wherein information indicating a difference between an impression that the poster image created by the creation unit has and the specified target impression is less than a predetermined threshold value.

\* \* \* \* \*